(12) United States Patent
Masutani et al.

(10) Patent No.: US 10,578,446 B2
(45) Date of Patent: Mar. 3, 2020

(54) ROUTE SEARCH APPARATUS, ROUTE SEARCH METHOD AND COMPUTER-READABLE STORAGE MEDIUM STORING PROGRAM

(71) Applicants: ZENRIN CO., LTD., Kitakyushu-shi (JP); TOYOTA JIDOSHA KABUSHIKI KAISHA, Toyota-shi (JP); AISIN AW CO., LTD., Anjo-shi (JP)

(72) Inventors: Tomohiko Masutani, Kitakyushu (JP); Hiroyuki Tashiro, Kitakyushu (JP); Tomoko Arita, Kitakyushu (JP); Motohiro Nakamura, Okazaki (JP); Tomoki Kodan, Nagoya (JP); Atsushi Ikeno, Minato (JP); Yoshitaka Kato, Minato (JP); Sadahiro Koshiba, Takahama (JP); Kazuteru Maekawa, Miyoshi (JP); Koichi Ushida, Okazaki (JP)

(73) Assignees: ZENRIN CO., LTD., Kitakyushu-shi (JP); TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 173 days.

(21) Appl. No.: 15/121,576

(22) PCT Filed: Feb. 19, 2015

(86) PCT No.: PCT/JP2015/000798
§ 371 (c)(1),
(2) Date: Aug. 25, 2016

(87) PCT Pub. No.: WO2015/129214
PCT Pub. Date: Sep. 3, 2015

(65) Prior Publication Data
US 2016/0363455 A1    Dec. 15, 2016

(30) Foreign Application Priority Data

Feb. 27, 2014   (JP) .................................. 2014-036275

(51) Int. Cl.
G06F 19/00      (2018.01)
G01C 21/34      (2006.01)
G08G 1/0968     (2006.01)

(52) U.S. Cl.
CPC ... G01C 21/3453 (2013.01); G08G 1/096827 (2013.01)

(58) Field of Classification Search
CPC ..................... G01C 21/3453; G08G 1/096827
See application file for complete search history.

(56) References Cited

U.S. PATENT DOCUMENTS 8,326,531 B2 * 12/2012 Sawai ................... G01C 21/32
                                                          701/400
8,457,892 B2 *  6/2013 Aso ........................ B60W 30/10
                                                          701/400

(Continued)

FOREIGN PATENT DOCUMENTS

EP        1 614 996 A1    1/2006
JP       2005-91303 A     4/2005

(Continued)

OTHER PUBLICATIONS

International Search Report dated May 19, 2015 in PCT/JP2015/000798 filed Feb. 19, 2015.

*Primary Examiner* — Ronnie M Mancho
(74) *Attorney, Agent, or Firm* — Oblon, McClelland, Maier & Neustadt, L.L.P.

(57) ABSTRACT

A route search apparatus configured to search a route from a set place of departure to a set destination comprises network data that includes nodes and links representing a road network, an average cost value indicating an average of (Continued)

travel time of each of the links, and a variance value indicating a degree of variance of the travel time, and a route searcher configured to determine the route from the place of departure to the destination as a recommended route, based on the average cost value, the variance value and a weight coefficient of the variance value.

20 Claims, 13 Drawing Sheets

(56) References Cited

U.S. PATENT DOCUMENTS

| | | | | |
|---|---|---|---|---|
| 8,494,741 B2 * | 7/2013 | Takamatsu | ............ | B60W 10/06 180/170 |
| 8,510,038 B2 * | 8/2013 | Tanizaki | ............ | G01C 21/3658 340/988 |
| 8,612,273 B2 * | 12/2013 | Johnson | ................ | G06Q 10/02 705/7.11 |
| 8,768,597 B2 * | 7/2014 | Kagawa | ................ | B60W 30/16 701/96 |
| 8,774,993 B2 * | 7/2014 | Harada | ................ | B60K 6/365 701/22 |
| 8,868,325 B2 * | 10/2014 | Morotomi | .............. | G08G 1/167 701/300 |
| 9,014,893 B2 * | 4/2015 | Yamamoto | ................ | B60L 7/14 180/65.265 |
| 9,140,565 B2 * | 9/2015 | Taguchi | .............. | B60W 30/146 |
| 9,221,341 B2 * | 12/2015 | Okita | ..................... | B60K 35/00 |
| 9,262,918 B2 * | 2/2016 | Otake | .................... | G08G 1/095 |
| 2008/0025222 A1 * | 1/2008 | Nikolova | ................ | H04L 45/12 370/238 |
| 2014/0129132 A1 * | 5/2014 | Yoshizu | ................ | G08G 1/0112 701/400 |
| 2015/0151638 A1 * | 6/2015 | Tagawa | .................... | B60L 7/14 701/22 |
| 2015/0160025 A1 * | 6/2015 | Konig | ................ | G01C 21/3415 701/410 |

FOREIGN PATENT DOCUMENTS

| | | |
|---|---|---|
| JP | 2008-241605 A | 10/2008 |
| JP | 2012-141145 A | 7/2012 |

* cited by examiner

Fig.6

| STEPS | SUB-STEPS | PROCESSING DETAILS ($\lambda=1$) |
|---|---|---|
| S14 | C1 | SET NODE N1 AS POINT OF DEPARTURE S AND NODE N4 AS DESTINATION POINT G |
| S16 | C2 | SET DEPARTURE POINT INFORMATION |
| S18 | C3 | GENERATE CANDIDATE LABEL<br>T1(15,3)→V1(16.4)<br>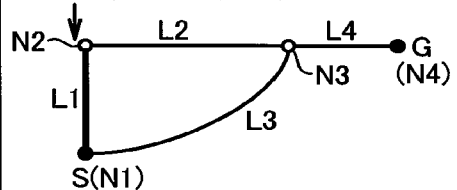 |
| | C4 | GENERATE CANDIDATE LABEL<br>T2(30,15)→V2(37.7)<br>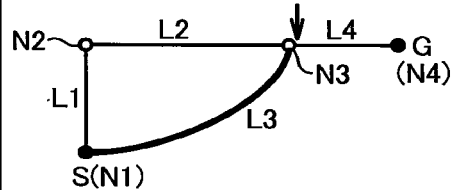 |
| S20 | C5 | DETERMINE FIXED LABEL<br>V1(16.4)<V2(37.7)→V1(16.4) |
| S18 | C6 | GENERATE CANDIDATE LABEL<br>(31,6)→V3(35.9)<br>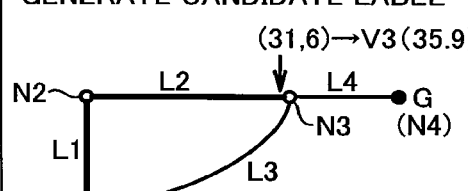 |
| S20 | C7 | DETERMINE FIXED LABEL<br>V3(35.9)<V2(37.7)→V3(35.9) |
| S18 | C8 | GENERATE CANDIDATE LABEL<br>T4(46,16)<br>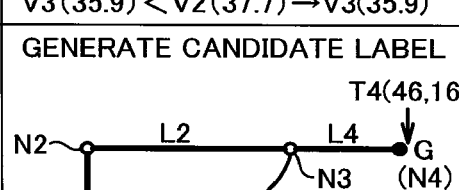 |
| S20, S22 | C9 | EVENTUALLY DETERMINE LABEL<br>ROUTE: S→L1→L2→L4→G<br>TIME:46 , STANDARD DEVIATION:4 |

Fig.10

| STEPS | PROCESSING DETAILS ( $\lambda=2$ ) |
|---|---|
| S52 | COMPARE CANDIDATE LABELS<br>[Network diagram: NETWORK DATA NW2, showing nodes S(N6), N7, N8, N9, N10, N11, G(N30), with links L5-L14 and routes R5-R8, candidate labels T5~T8]<br><table><tr><th>CANDIDATE LABEL</th><th>INTEGRATED COST VALUE</th><th>INTEGRATED VARIANCE VALUE</th><th>CANDIDATE OVERALL COST VALUE</th></tr><tr><td>T5(R5)</td><td>29</td><td>9</td><td>35.0</td></tr><tr><td>T6(R6)</td><td>18</td><td>300</td><td>52.6</td></tr><tr><td>T7(R7)</td><td>19</td><td>200</td><td>47.3</td></tr><tr><td>T8(R8)</td><td>25</td><td>190</td><td>52.6</td></tr></table> |
| S54 | DETERMINE FIRST HALFWAY ROUTE CANDIDATE<br>HALFWAY ROUTE R5 (CANDIDATE LABEL T5) |
| S56, 58 | THERE IS ANY PROVISIONAL SECOND HALFWAY ROUTE CANDIDATE.<br>COMPARE PROVISIONAL SECOND HALFWAY ROUTE CANDIDATES<br><table><tr><th>CANDIDATE LABEL</th><th>INTEGRATED COST VALUE</th><th>INTEGRATED VARIANCE VALUE</th><th>CANDIDATE OVERALL COST VALUE</th></tr><tr><td><s>T5(R5)</s></td><td><s>29</s></td><td><s>9</s></td><td><s>35.0</s></td></tr><tr><td>T6(R6)</td><td>18</td><td>300</td><td>52.6</td></tr><tr><td>T7(R7)</td><td>19</td><td>200</td><td>47.3</td></tr><tr><td>T8(R8)</td><td>25</td><td>190</td><td>52.6</td></tr></table><br>PROVISIONAL SECOND HALFWAY ROUTE CANDIDATES |
| S60 | DETERMINE SECOND HALFWAY ROUTE CANDIDATE<br>HALFWAY ROUTE R7 (CANDIDATE LABEL T7) |

Fig.11

| STEPS | PROCESSING DETAILS ( $\lambda$ =2) | | | | |
|---|---|---|---|---|---|
| S56,58 | THERE IS ANY PROVISIONAL SECOND HALFWAY ROUTE CANDIDATE. COMPARE PROVISIONAL SECOND HALFWAY ROUTE CANDIDATES | | | | |
| | CANDIDATE LABEL | INTEGRATED COST VALUE | INTEGRATED VARIANCE VALUE | CANDIDATE OVERALL COST VALUE | |
| | ~~T5(R5)~~ | ~~29~~ | ~~9~~ | ~~35.0~~ | |
| | T6(R6) | 18 | 300 | 52.6 | ← PROVISIONAL SECOND HALFWAY ROUTE CANDIDATE |
| | ~~T7(R7)~~ | ~~19~~ | ~~200~~ | ~~47.3~~ | |
| | T8(R8) | 25 | 190 | 52.6 | |
| S60 | DETERMINE SECOND HALFWAY ROUTE CANDIDATE HALFWAY ROUTE R6 (CANDIDATE LABEL T6) | | | | |
| S56 | THERE IS NO PROVISIONAL SECOND HALFWAY ROUTE CANDIDATE. | | | | |
| S62 | DETERMINE HALFWAY ROUTES FIXED HALFWAY ROUTES R5, R6, R7 (FIXED LABELS T5, T6, T7) | | | | |

Fig.12

| STEPS | PROCESSING DETAILS ( λ =2) |
|---|---|
| S52 | COMPARE CANDIDATE LABELS<br>NETWORK DATA NW2<br>*(diagram showing nodes N6(S), N7, N8, N9, N10, N11, N30(G) connected by links L5–L14 and routes R9, R10, R11; candidate labels T9~T11)*<br><br>| CANDIDATE LABEL | INTEGRATED COST VALUE | INTEGRATED VARIANCE VALUE | CANDIDATE OVERALL COST VALUE |<br>\|---\|---\|---\|---\|<br>\| T9(R9) \| 89 \| 809 \| 145.9 \|<br>\| T10(R10) \| 78 \| 1100 \| 144.3 \|<br>\| T11(R11) \| 79 \| 1000 \| 142.3 \| |
| S54 | DETERMINE FIRST HALFWAY ROUTE CANDIDATE<br>HALFWAY ROUTE R11 (CANDIDATE LABEL T11) |
| S56,58 | THERE IS ANY PROVISIONAL SECOND HALFWAY ROUTE CANDIDATE.<br>COMPARE PROVISIONAL SECOND HALFWAY ROUTE CANDIDATES<br><br>| CANDIDATE LABEL | INTEGRATED COST VALUE | INTEGRATED VARIANCE VALUE | CANDIDATE OVERALL COST VALUE |<br>\|---\|---\|---\|---\|<br>\| T9(R9) \| 89 \| 809 \| 145.9 \|<br>\| T10(R10) \| 78 \| 1100 \| 144.3 \| ← PROVISIONAL SECOND HALFWAY ROUTE CANDIDATE<br>\| ~~T11(R11)~~ \| ~~79~~ \| ~~1000~~ \| ~~142.3~~ \| |
| S60 | DETERMINE SECOND HALFWAY ROUTE CANDIDATE<br>HALFWAY ROUTE R10 (CANDIDATE LABEL T10) |
| S56 | THERE IS NO PROVISIONAL SECOND HALFWAY ROUTE CANDIDATE. |
| S62 | DETERMINE HALFWAY ROUTES<br>FIXED HALFWAY ROUTES R10, R11<br>(FIXED LABELS T10, T11) |

ROUTE SEARCH APPARATUS, ROUTE SEARCH METHOD AND COMPUTER-READABLE STORAGE MEDIUM STORING PROGRAM

CROSS-REFERENCE TO RELATED APPLICATIONS

The present application claims priority from Japanese patent application P2014-36275 filed on Feb. 27, 2014, the content of which is hereby incorporated by reference into this application.

TECHNICAL FIELD

The present invention relates to a technique of searching a route from a place of departure to a destination.

BACKGROUND ART

Car navigation system mounted on the automobile, cell phones, handheld game consoles, PNDs (Personal Navigation Devices) and PDAs (Personal Digital Assistants) have recently been known as the route search apparatus configured to search a route from a place of departure to a destination as described in, for example, JP 2012-141145A and JP 2008-241605A.

For example, the technique disclosed in JP 2012-141145A uses a reference travel time and a variance value representing a variance of the travel time that are set with regard to each link, to search a route from a place of departure to a destination. More specifically, this technique calculates an expected time required for a guide route by sequential summation of the reference travel times of the respective links constituting the guide route, and calculates the probability of the expected time by sequential summation of the variance values of the respective links.

SUMMARY

Technical Problem

In the technique disclosed in JP 2012-141145A, however, a fixed value is set as the variance value with regard to each link. This may provide a result of route search that lacks flexibility. For example, the user may require route search by taking into account only the reference travel time or may require route search by taking into account the variance value. Even in the case of route search by taking into account the variance value, there is a demand for changing the degree of the variance value in calculation of the result of route search. Other needs over the prior art include, for example, improvement of the processing efficiency, downsizing of the apparatus, cost reduction, resource saving and improvement of the convenience.

Solution to Problem

In order to solve the problems described above, the invention may be implemented by aspects or applications described below.

(1) According to one aspect of the invention, there is provided a route search apparatus configured to search a route from a set place of departure to a set destination. This route search apparatus may comprise a storage part configured to store network data that include nodes and links representing a road network, an average cost value indicating an average of travel time of each of the links, and a variance value indicating a degree of variance of the travel time; and a route searcher configured to determine the route from the place of departure to the destination as a recommended route, based on an overall cost value calculated according to a function including the average cost value, the variance value and a weight coefficient of the variance value. The route search apparatus of this aspect can determine the recommended route by taking into account the weight coefficient of the variance value, thus allowing for flexible route search.

(2) In the route search apparatus of the above aspect, the route searcher may calculate the overall cost value by adding a correction value calculated as a product of the weight coefficient and a value having a positive correlation to an integrated value of the variance values corresponding to links that are passed through between the place of departure and the destination, to an integrated value of the average cost values corresponding to the links, in a plurality of route candidates that are candidates of the recommended route. The route search apparatus of this aspect can readily calculate the overall cost value using a predetermined function.

(3) In the route search apparatus of the above aspect, the route searcher may determine a route from the place of departure to a node corresponding to a specific point in the middle of the route from the place of departure to the destination, as a halfway route of the recommended route, based on a candidate overall cost value that is provided as a sum of a first term representing an integrated value of the average cost values corresponding to links that are passed through from the place of departure to the node corresponding to the specific point in the middle of the route from the place of departure to the destination and a second term representing a correction value calculated based on the weight coefficient and an integrated value of the variance values corresponding to the links that are passed through. The route search apparatus of this aspect may determine the halfway route based on the candidate overall cost value that is the sum of the integrated value of the average cost values and the correction value. This configuration can determine the halfway route by taking into account the weight coefficient of each link.

(4) In the route search apparatus of the above aspect, the route searcher may determine, as the halfway route, a halfway route candidate having a smallest candidate overall cost value out of a plurality of the candidate overall cost values, among a plurality of halfway route candidates that are candidates of the halfway route. The route search apparatus of this aspect may determine the halfway route candidate having the smallest candidate overall cost value after addition of the correction value, as the halfway route. This configuration simplifies the process of determining the halfway route.

(5) In the route search apparatus of the above aspect, when there are two or more candidate overall cost values that are different from each other by at most a predetermined value, out of the candidate overall cost values of a plurality of halfway route candidates that are candidates of the halfway route, the route searcher may determine the halfway route, based on one of the first term and the second term that is selected according to the weight coefficient. The route search apparatus of this aspect can flexibly determine the recommended route from the place of departure to the destination, based on the set weight coefficient. For example, in the case of a small weight coefficient, more emphasis is placed on the average cost value than the variance value, and a route having a smaller integrated value of the average cost values may be determined as the recommended route. In the case of a large weight coefficient, more emphasis is placed on the variance value than the average cost value, and a route having a smaller integrated value of the variance values may be determined as the recommended route.

(6) In the route search apparatus of the above aspect, the route searcher may perform a first determination process that determines a first halfway route candidate having a smallest candidate overall cost value out of a plurality of the candidate overall cost values, among a plurality of halfway route candidates that are candidates of the halfway route; a second determination process that is performed when there is at least one provisional second halfway route candidate having a smaller integrated value of the average cost values than an integrated value of the average cost values of the first halfway route candidate, out of remaining halfway route candidates that are the halfway route candidates other than the first halfway route candidate, and determines a second halfway route candidate having a smallest candidate overall cost value out of at least one provisional second halfway route candidate; and a third determination process that specifies the second halfway route candidate determined by the second determination process, as the first halfway route candidate, specifies the halfway route candidate other than the determined first halfway route candidate and second halfway route candidate, as the remaining halfway route candidate, and repeats the second determination process. The route searcher may determine the first halfway route candidate and the second halfway route candidate determined by the first to the third determination processes, as the halfway routes. The route search apparatus of this aspect can more accurately determine a route having a smallest overall cost value as the recommended route.

(7) In the route search apparatus of the above aspect, when there are a plurality of halfway route candidates that are candidates of a halfway route from the place of departure to a node corresponding to a specific point in the middle of the route from the place of departure to the destination, the route searcher may process statistical information indicating histograms of the travel time of respective links corresponding to roads that are passed through in each of the halfway route candidates, by convolution operation, so as to generate candidate statistical information indicating a histogram of the travel time with regard to each of the halfway route candidates. The route searcher may determine the halfway route out of the plurality of halfway route candidates, based on a candidate overall cost value calculated according to a function including the weight coefficient and a candidate average cost value representing an average of the travel time of each of the halfway route candidates and a candidate variance value representing a degree of variance of the travel time of the halfway route candidate that are calculated from the candidate statistical information. The route search apparatus of this aspect may use the candidate variance value calculated from the candidate statistical information after the convolution operation to calculate the candidate overall cost value. This configuration can calculate the candidate overall cost value using a more accurate variance value having a reduced error.

(8) In the route search apparatus of the above aspect, the route searcher may calculate the candidate overall cost value according to a function including a first term representing the candidate average cost value and a second term representing a correction value calculated based on the candidate variance value and the weight coefficient. The route search apparatus of this aspect can readily calculate the candidate overall cost value using the function including the candidate average cost value and the correction value.

(9) In the route search apparatus of the above aspect, when there are a plurality of the candidate overall cost values that are different from each other by at most a predetermined value, out of the candidate overall cost values of the plurality of halfway route candidates, the route searcher may determine the halfway route based on one of the first term and the second term selected according to the weight coefficient. The route search apparatus of this aspect can flexibly determine the recommended route from the place of departure to the destination, based on the set weight coefficient. For example, in the case of a small weight coefficient, more emphasis is placed on the candidate average cost value than the candidate variance value, and a route having the smaller candidate average cost value may be determined as the recommended route. In the case of a large weight coefficient, more emphasis is placed on the candidate variance value than the candidate average cost value, and a route having the smaller candidate variance value may be determined as the recommended route.

(10) In the route search apparatus of the above aspect, the route searcher may determine the recommended route with regard to each of a plurality of different values of the weight coefficient. The route search apparatus of this aspect may determine the recommended route with regard to each value of the weight coefficient and can thus inform the user of a plurality of recommended routes having different values of the weight coefficient.

(11) In the route search apparatus of the above aspect, the route searcher may process statistical information indicating histograms of the travel time of respective links by convolution operation, so as to generate statistical information indicating a histogram of the travel time of the recommended route, and may calculate an index indicating a degree of variance of the travel time of the recommended route, based on a standard deviation of the generated statistical information. The route search apparatus of this aspect may calculate the standard deviation from the statistical information after the convolution operation and can thus calculate the more accurate degree of variance of the travel time with regard to the recommended route.

(12) In the route search apparatus of the above aspect, the average cost value and the variance value with regard to each of the links may be calculated based on original information regarding travel time data of the travel time and a probability of each travel time. When the travel time of a link is affected by a feature at a certain frequency, the average cost value of a specific link that is the link affected by the feature may be calculated from the entire travel time data and all the probabilities included in the original information, and the variance value of the specific link may be calculated from the travel time data and the probability that are estimated to be not affected by the feature in the original information. The route search apparatus of this aspect can provide the average cost value that accurately reflects the travel time data of the original information, while correcting the variance value that is made excessive by the effect of the feature.

The invention may be implemented by various aspects, for example, a route search method, a route search system, a computer program or data configured to implement any of the apparatus, the method or the system, and a non-transitory physical recording medium in which the computer program of data is recorded, in addition to the route search apparatus.

BRIEF DESCRIPTION OF DRAWINGS

FIG. 6 is a diagram showing a concrete example of the route search process;

FIG. 10 is a first diagram illustrating the flowchart of FIG. 9;

FIG. 11 is a second diagram illustrating the flowchart of FIG. 9;

FIG. 12 is a third diagram illustrating the flowchart of FIG. 9;

DESCRIPTION OF EMBODIMENTS

A. First Embodiment

Figure 1:
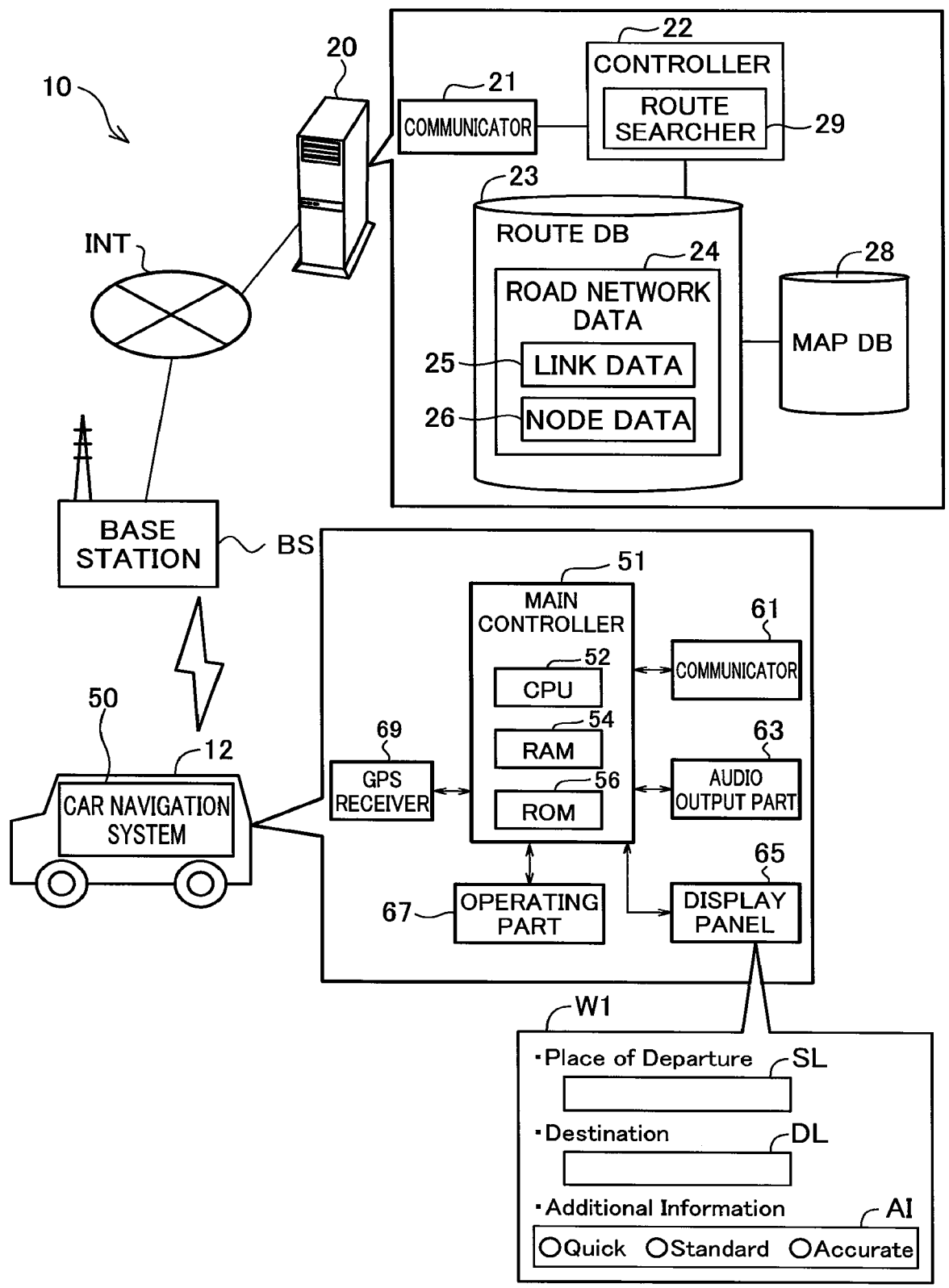
FIG. 1 is a diagram illustrating the configuration of a route search system.

FIG. 1 is a diagram illustrating the configuration of a route search system 10 according to a first embodiment of the invention. The route search system 10 includes a route server 20 provided as a route search apparatus and a car navigation system 50 mounted on an automobile 12. Both the route server 20 and the car navigation system 50 are connected to the Internet INT. The car navigation system 50 is wirelessly connected to the Internet INT via a base station BS. The route search system 10 is a system configured to display a recommended route from a set place of departure to a set destination in a visible manner on a display panel 65 included in the car navigation system 50.

The car navigation system 50 includes a GPS receiver 69, a main controller 51, an operating part 67, a communicator 61, an audio output part 63 and a display panel 65. The GPS receiver 69 receives, in the form of radio wave, information for identifying the current location (latitude and longitude) of the car navigation system 50 measured by using satellites included in GPS (global positioning system).

The display panel 65 includes a liquid crystal display and a drive circuit configured to drive the liquid crystal display. The display panel 65 is not necessarily limited to the liquid crystal display, but any of various display devices such as organic EL display may be employed for the display panel 65. The display panel 65 causes the user to visually recognize various information including a place of departure and a destination. A search setting window W1 displayed on the display panel 65 includes a field SL for entering the place of departure, a field DL for entering the destination and a field AI for entering additional information. The user operates the operating part 67 to fill the respective fields SL, DL and AI. The additional information herein denotes information regarding the degree of accuracy in route search to be performed by the route server 20. More specifically, this information regards a weight coefficient $\lambda$ for a variance value described later. The search setting window W1 is configured to allow for selection of one or a plurality of options among three options "quick", "standard" and "accurate".

The following relationships may be provided between the three options shown in the field AI of additional information and the weight coefficient $\lambda$:

(i) option "quick". The weight coefficient $\lambda$ is set to "0", and a shortest route having the shortest average travel time among a plurality of routes from the place of departure to the destination is determined irrespective of the variance value as a recommended route by the route server 20;

(ii) option "standard": The weight coefficient $\lambda$ is set to "1", and a route placing more emphasis on the variance value than the option "quick" among the plurality of routes from the place of departure to the destination is determined as a recommended route by the route server 20; and (iii) option "accurate": The weight coefficient $\lambda$ is set to "2", and a route placing more emphasis on the variance value than the option "standard" among the plurality of routes from the place of departure to the destination is determined as a recommended route by the route server 20.

The weight coefficient $\lambda$, is not limited to the three levels "0", "1" and "2", but may be set to a plurality of integral numbers or may be set to continuous numerical values by using a bar or the like.

The audio output part 63 is comprised of, for example, a speaker configured to output voice and a drive circuit configured to drive the speaker. The communicator 61 makes wireless data communication or voice communication with the base station BS. The operating part 67 is an input device comprised of, for example, a numeric keypad, arrow keys and a touch panel. The operating part 67 receives inputs of various information for route search, for example, the place of departure and the destination.

The main controller 51 controls the operations of the respective components of the car navigation system 50. The main controller 51 includes a CPU 52, a RAM 54 and a ROM 56. The CPU 52 loads and executes a program stored in the ROM 56, on the RAM 54 to implement functions for performing various processes. For example, the main controller 51 controls the display panel 65 to show a map image, a recommended route and the current location. The main controller 51 also controls the communicator 61 to make communication with the route server 20 via the base station BS. The main controller 51 may measure current location information of the car navigation system 50 using the GPS via the GPS receiver 69 at predetermined time intervals to generate information indicating the place of departure.

The route server 20 is a server configured to search a route from a place of departure to a destination specified by the car navigation system 50 in response to a route search request from the car navigation system 50 and send output information indicating a search result via the Internet INT to the car navigation system 50. In the description below, search of a route from a place of departure to a destination performed by the route server 20 is called route search process. The route server 20 includes a communicator 21, a controller 22, a route database 23 (also called route DB 23) as a memory unit (memory device) and a map database 28 (also called map DB 28). The communicator 21 makes communication with the car navigation system 50 via the Internet INT. The controller 22 controls the operations of the route server 20. The route DB 23 stores road network data 24 that shows a road network on a map by network data. The road network data 24 includes link data 25 and node data 26. The node data 26 specifies a plurality of nodes representing reference points on roads. The link data 25 specifies a plurality of links connecting the plurality of nodes specified by the node data 26. The details of the link data 25 and the node data 26 will be described later. The map DB 43 stores map data that is to be supplied to the car navigation system 50, in a vector data format. The map data may be stored a raster data format such as bitmap format or JPEG format, in place of the vector format. This map data includes data regarding the configuration of features such as land features, buildings and roads.

Figure 2:
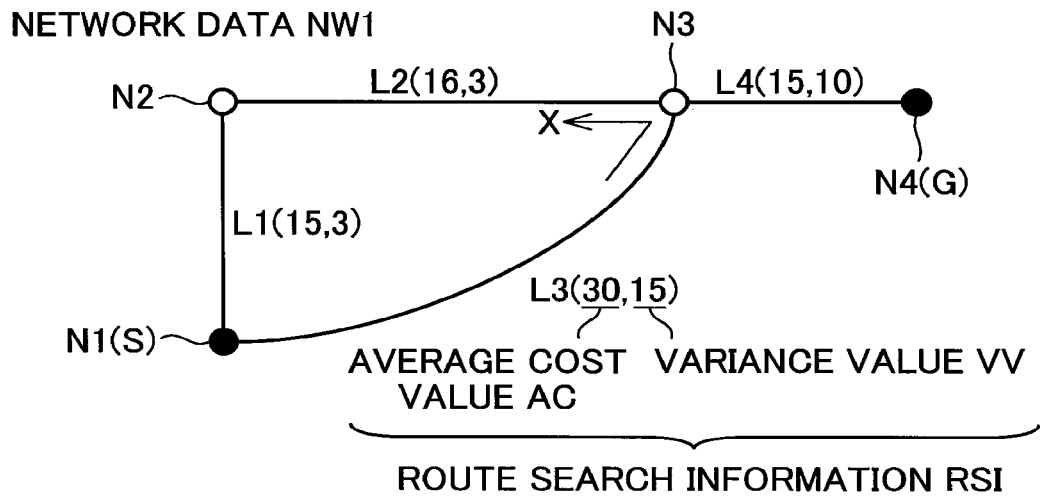
FIG. 2 is a diagram illustrating network data.

FIG. 2 is a diagram illustrating road network data NW1 indicating roads in a predetermined area as a concrete example of the road network data 24. The road network data NW1 is data showing an arrangement of roads by links and nodes. In the description below, each node in the drawings may be expressed individually by a sign including an alphabetical letter "N" with a number as the suffix, and each link in the drawings may be expressed individually by a sign including an alphabetical letter "L" with a number as the suffix. FIG. 2 shows four nodes Ni to N4 and four links L1 to L4. The nodes N1 to N4 indicate characteristic reference points on roads or lanes. This reference point may be, for example, an intersection, a road junction or a point where the width of the road starts changing. The links L1 to L4 indicate roads or lanes that interconnect the nodes N1 to N4. Route search information RSI used to search a route from a place of departure S to a destination point G is specified corresponding to each of the links L1 to L4. The route search information RSI includes an average cost value AC indicating an average of travel time with regard to each of the links L1 to L4 and a variance value VV indicating a variance of the travel time. The average cost value AC may be calculated from a histogram that is data shown by the travel time as abscissa and the probability (%) of each travel time as ordinate. According to this embodiment, this histogram is generated based on probe data collected from probe cars via a network. According to this embodiment, the variance value VV denotes a dispersion calculated from the histogram. According to another embodiment, the variance value VV may be a standard deviation in place of the dispersion. In the road network data NW1 of FIG. 2, a first numerical value in parentheses with regard to each of the links L1 to L4 shows the average cost value AC, and a second numerical value shows the variance value VV. Traffic control information regarding traffic regulations is also specified in the road network data NW1. The traffic control information includes, for example, information indicating no left-turn from the link L3 to the link L2.

Figure 3:
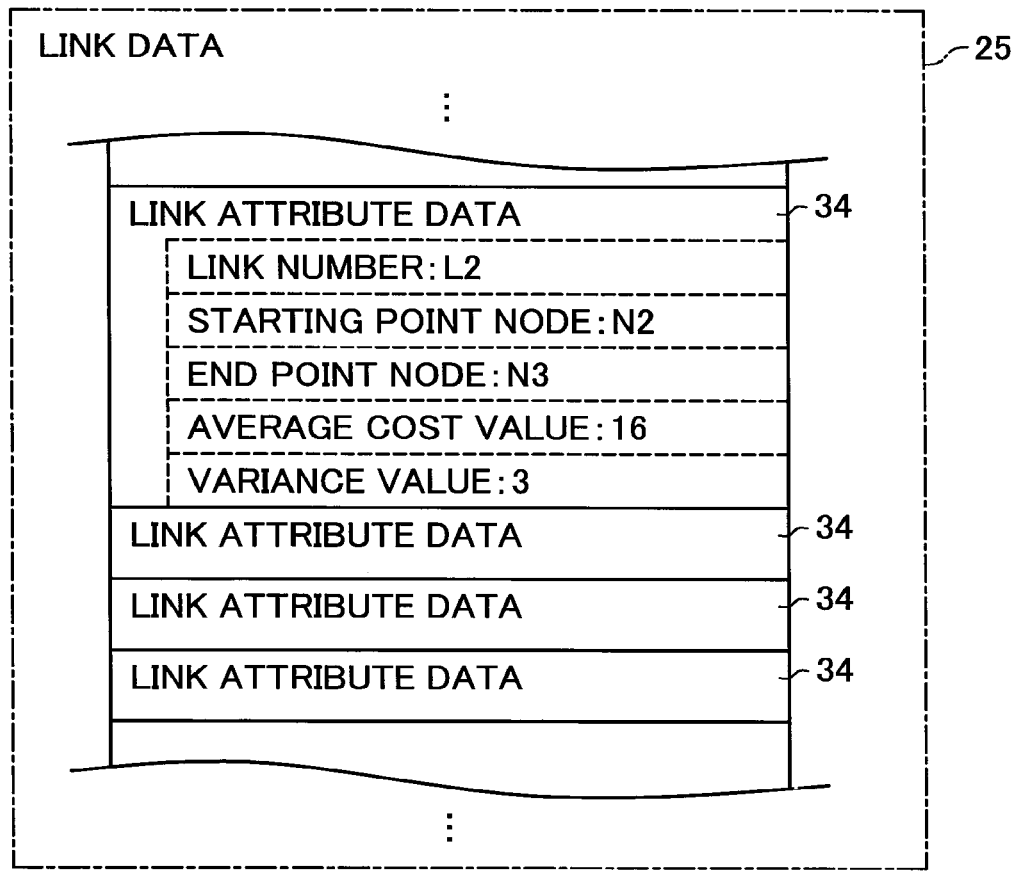
FIG. 3 is a diagram showing the detailed structure of link data.

FIG. 3 is a diagram showing the detailed structure of the link data 25 in the road network data 24. The link data 25 includes link attribute data 34 showing the attribute of each link. The attribute of a link shown by the link attribute data 34 includes a link number, a starting point node, an end point node, an average cost value AC and a variance value VV.

The link number of the link attribute data 34 denotes a unique number assigned to each link for identification of the link. The starting point node of the link attribute data 34 denotes a sign for identifying a node with which the link is connected as the starting point. The end point node of the link attribute data 34 denotes a sign for identifying a node with which the link is connected as the end point. The average cost value AC of the link attribute data 34 indicates the average of the travel time of the link. The variance value VV of the link attribute data 34 indicates the degree of variance of the travel time of the link. The illustrated example of FIG. 3 shows the detailed contents of the link attribute data 34 with regard to the link L2 to which the link number "L2" is assigned. More specifically, the link attribute data 34 shows that the link L2 connects the "starting point node N2" to the "end point N3", the average cost value AC of the link L2 is 16 minutes, and the variance value VV of the link L2 is 3.

Figure 4:
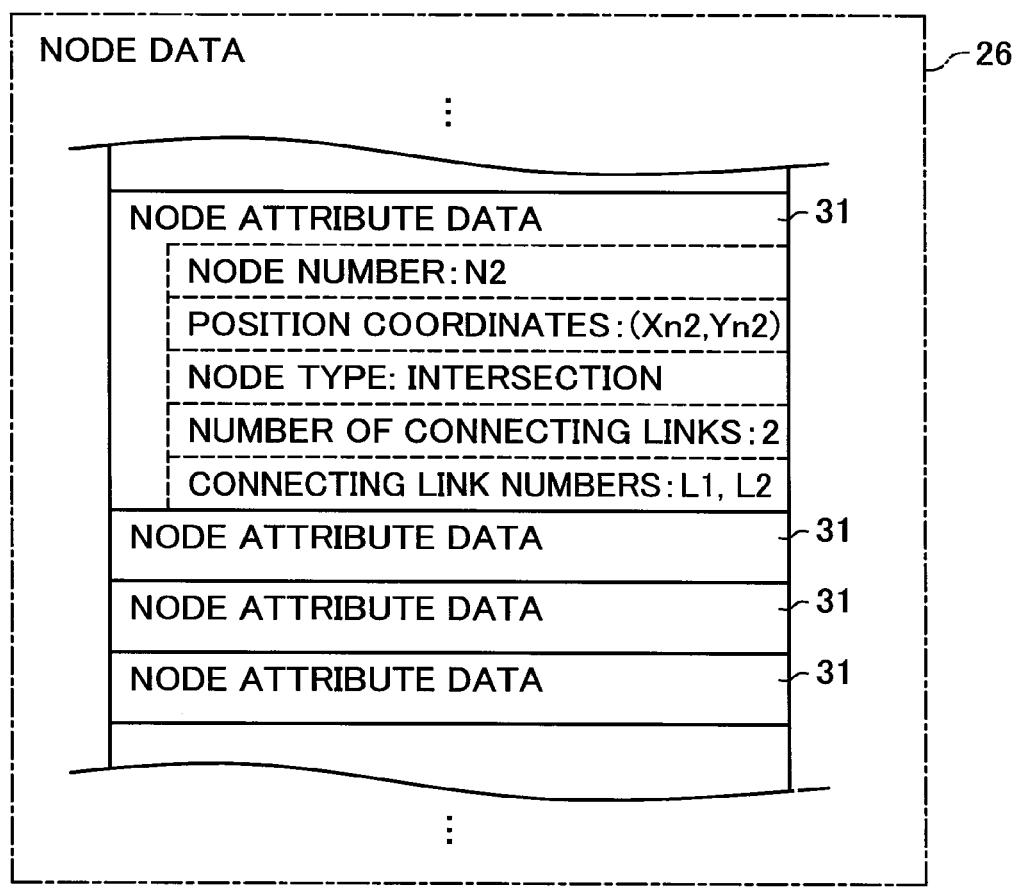
FIG. 4 is a diagram showing the detailed structure of node data.

FIG. 4 is a diagram showing the detailed structure of the node data 26 in the road network data 24. The node data 26 includes node attribute data 31 showing the attribute of each node. The attribute of a node shown by the node attribute data 31 includes a node number, position coordinates, a node type, the number of connecting links and connecting link numbers.

The node number of the node attribute data 31 denotes a unique number assigned to each node for identification of the node. The position coordinates of the node attribute data 31 indicate the position of the node on the map. The node type of the node attribute data 31 denotes the type of a reference point shown by the node. The number of connecting links of the node attribute data 31 indicate the number of links connecting with the node. The connecting link numbers of the node attribute data 31 denote information for identifying the links connecting with the node. The illustrated example of FIG. 4 shows the detailed contents of the node attribute data 31 with regard to the node N2 to which the node number "N2" is assigned. More specifically, the node attribute data 31 shows that the node N2 is located at the coordinates "Xn2 (longitude), Yn2 (latitude))", the node N2 represents an "intersection", the number of links connecting with the node N2 is "2", and the connecting link numbers are "L1, L2".

Figure 5:
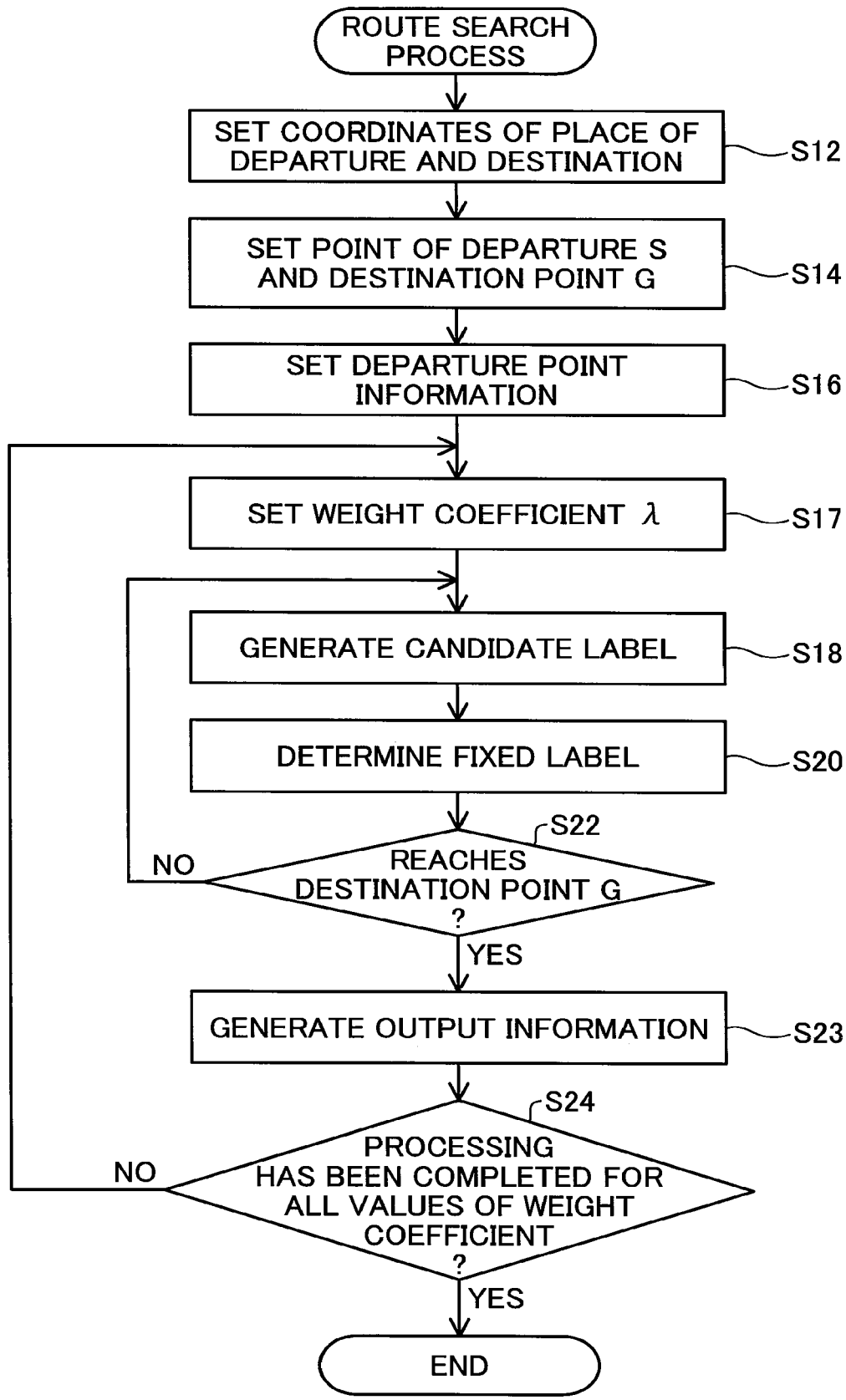
FIG. 5 is a flowchart showing a route search process.

FIG. 5 is a flowchart showing a route search process performed by a route searcher 29 of the route server 20. The route search process is started when the route server 20 receives startup information of the route search process from the car navigation system 50. The startup information includes point information regarding a place of departure and a destination set by the user using the car navigation system 50, and coefficient information regarding the weight coefficient $\lambda$. More specifically, the user uses the car navigation system 50 to enter a place of departure, a destination and additional information regarding the weight coefficient $\lambda$, and uses the operating part 67 to provide the route server 20 with an instruction to start the route search process. The information regarding the place of departure may not be generated by the user's entry but may be automatically generated based on information regarding the place of departure received by the GPS receiver 69 of the car navigation system 50.

On the start of the route search process, the route searcher 29 sets the coordinates of the place of departure and the coordinates of the destination used in the route search process, based on the point information included in the startup information (step S12). After step S12, the route searcher 29 sets a point of departure S as the starting point of a route and a destination point G as the end point of the route in the route search process, based on the coordinates of the place of departure and the coordinates of the destination (step S14) In an example described in this embodiment, the node N1 is set as the point of departure S, and the node N4 is set as the destination point G. When the set place of departure or the set destination is not located at a node, a point on a link nearest to the set place of departure or the set destination (may be called lead-in point) is set as the point of departure S or the destination point G. The route searcher 29 subsequently determines a route having a smallest overall cost value that is a summation of the route passed through as a recommended route among routes possibly taken from the point of departure S to the destination point G. The overall cost value denotes the sum of an integrated value of average cost values AC corresponding to links which are passed through from the point of departure S to the destination point G and a correction value calculated based on the weight coefficient λ and an integrated value of variance values VV corresponding to the links which are passed through. More specifically, according to this embodiment, the overall cost value is determined by Equation (1) given below:

[Math. 1]

$$\text{Overall cost value} = \Sigma A + \lambda \sqrt{\Sigma V} \tag{1}$$

where A denotes the average cost value AC of each of the links on a route from the point of departure S to the destination point G; λ denotes the weight coefficient; and V denotes the variance value VV of each of the links on the route from the point of departure S to the destination point G.

After step S14, the route searcher 29 sets departure point information regarding the point of departure S (step S16). The departure point information indicates an average cost value AC and a variance value VV from the point of departure S to a next node. When the point of departure S is located at a node, both the average cost value AC and the variance value VV are set to zero. When the point of departure S is located on a link, the average cost value AC and the variance value VV corresponding to the link on which the point of departure S is located are calculated and set by division using a ratio of a distance from the point of departure S to an end point of the link to a distance from a starting point to the end point of the link. According to this embodiment, both the average cost value AC and the variance value VV at the point of departure S are set to zero.

After step S16, the route searcher 29 sets the weight coefficient λ (step S17). The weight coefficient λ, is set, based on the coefficient information with regard to the weight coefficient λ, included in the startup information supplied from the car navigation system 50. When a plurality of values are set to the weight coefficient λ, the route searcher 29 selects an arbitrary value of the weight coefficient λ and performs subsequent steps. After step S17, the route searcher 29 generates a candidate label that is an index for determining links which are to be passed through on a route from the point of departure S to the destination point G (step S18). When the candidate label is generated for a certain link located in the middle of the route from the point of departure S to the destination point G, the candidate label is set at an end point (node) of the certain link. The candidate label is comprised of an integrated value of the average cost values AC of the respective links between the point of departure S and the certain link and an integrated value of the variance values VV of the respective links between the point of departure S and the certain link. A candidate overall cost value is then calculated, based on the information included in the candidate label. More specifically, the candidate overall cost value is calculated according to Equation (2) given below:

[Math. 2]

$$\text{Candidate overall cost value} = \Sigma A1 + \lambda \sqrt{\Sigma V1} \tag{2}$$

where A1 denotes the average cost value AC of each of the links on a route from the point of departure S to a predetermined node that is an end point in the middle of the route; λ denotes the weight coefficient; and V1 denotes the variance value VV of each of the links which are passed through from the point of departure S to the predetermined node that is the end point in the middle of the route.

After step S18, the route searcher 29 determines a candidate label having a smallest candidate overall cost value among at least one candidate overall cost value, as a fixed label (step S20). Determining the fixed label fixes a route (halfway route) to a node (temporary fixed node) that is located in the middle of the route from the point of departure S to the destination point G. The route searcher 29 subsequently determines whether a last link or a node (last node) that is an end point of the last link in the halfway route toward the destination point G is a link or a node where the destination point G is located (step S22). When it is determined that the last link or the last node is the link or the node where the destination point G is located, the route searcher 29 fixes the halfway route as a recommended route. The route searcher 29 then generates output information to display the fixed recommended route on the display panel 65 of the car navigation system 50 (step S23). More specifically, the output information includes information regarding the recommended route from the point of departure S to the destination point G, information regarding an average travel time from the point of departure S to the destination point G and variance information regarding a variance of the average travel time. The details of this output information will be described later. After fixing the recommended route, the route searcher 29 determines whether the recommended route has been fixed with regard to all the values of the weight coefficient λ included in the startup information (step S24). When it is determined that the recommended route has been fixed with regard to all the values of the weight coefficient λ, the route searcher 29 terminates the route search process.

When it is determined that the last link or the last node is not the link or the node where the destination point G is located, the route searcher 29 further extends the search tree from the end point of the halfway route toward the destination point G by the Dijkstra's algorithm and generates a candidate label (step S18). The route searcher 29 then performs the series of processes of and after step S20 again. When it is determined that the recommended route has not yet been fixed with regard to all the values of the weight coefficient λ, the route searcher 29 sets another value of the weight coefficient λ for which the recommended route has not yet been fixed at step S17 and performs the subsequent series of processes again.

FIG. 6 is a diagram showing a concrete example of the route search process. Steps shown in FIG. 6 correspond to the steps shown in FIG. 5. Sub-steps shown in FIG. 6 show concrete processes performed at the respective steps shown in FIG. 5. FIG. 6 illustrates a concrete example of the route search process when the route searcher 29 sets the node N1 shown in FIG. 2 as the point of departure S and sets the node N4 shown in FIG. 2 as the destination point G. The weight coefficient λ, is set to "1" at step S17. Sub-steps C1 and C2 respectively correspond to steps S14 and S16.

The route searcher 29 extends the search tree from the point of departure S toward the destination point G by the Dijkstra's algorithm. More specifically, the route searcher 29 (shown in FIG. 1) refers to the node data 26 and the link data 25 and sets a candidate label from the point of departure S to an end point of a next link as shown in FIG. 6 (step S18). In the concrete example, first links from the node N1 as the point of departure S toward the destination point are the links L1 and the links L3. The route searcher 29 sets a candidate label T1 for a route from the point of departure S to an end point of the link L1 (or more specifically, at the end point of the link L1). The route searcher 29 then calculates a candidate overall cost value V1 based on the candidate label T1. The route searcher 29 also sets a candidate label T2 for a route from the point of departure S to an end point of the link L3 (sub step C4). The route searcher 29 then calculates a candidate overall cost value V2 based on the candidate label T2.

At sub-step C3, a candidate overall cost value of the route from the point of departure S to a next node N2 is calculated according to Equation (2) given above. More specifically, an integrated value of average cost values AC (integrated cost value) "15" is calculated by summing up an average cost value AC "0" set at the point of departure S and an average cost value AC "15" set at the link L1. At sub-step C3, an integrated value of variance values VV (integrated variance value) "3" is also calculated by summing up a variance value VV "0" set at the point of departure S and a variance value VV "3" set at the link L1. The route searcher 29 subsequently adds a correction value that is the product of the positive square root of the integrated variance value "3" and the weight coefficient λ, to the integrated cost value "15", so as to calculate a candidate overall cost value V1. The calculated candidate overall cost value V1 is equal to "16.4". According to this embodiment, the candidate overall cost value is rounded off to one decimal place.

At sub-step C4, a candidate overall cost value of the route from the point of departure S to a next node N3 is calculated according to Equation (2) given above. More specifically, an integrated cost value "30" is calculated by summing up the average cost value AC "0" set at the point of departure S and an average cost value AC "30" set at the link L3. At sub-step C4, an integrated variance value VV "15" is also calculated by summing up the variance value VV "0" set at the point of departure S and a variance value "15" set at the link L3. Like sub-step C3, the route searcher 29 subsequently adds a correction value that is the product of the positive square root of the integrated variance value "15" and the weight coefficient λ to the integrated cost value "30", so as to calculate a candidate overall cost value V2. The calculated candidate overall cost value V2 is equal to "37.7".

After calculation of the candidate overall cost values V1 and V2 from the point of departure S to the next nodes, a candidate label having the smaller candidate overall cost value between the candidate overall cost values V1 and V2 is determined as a fixed label. At sub-step C5, the candidate label having the candidate overall cost value V1 is determined as a fixed label. Accordingly the route from the point of departure S to the link L1 is fixed as a halfway route. When it is subsequently determined that the link L1 or the end point of the link L1 (node N2) is not the link or the node where the destination point G is located, the route searcher 29 further extends the search tree by the Dijkstra's algorithm to generate a candidate label (at sub-step C6). More specifically, the route searcher 29 refers to the node data 26 and the link data 25 to specify the link L2 from the node N2 toward the destination point G, and generates a candidate label T3 for a route from the point of departure S through the link L1 and the node N2 to the link L2. A candidate overall cost value V3 of the candidate label T3 is then calculated according to Equation (2) given above, like sub-steps C3 and C4. The candidate overall cost value V3 of the candidate label T3 generated at sub-step C6 is equal to "35.9". The candidate label T3 having the candidate overall cost value V3 is set at an end point of the link L2 (node N3). There are two candidate labels T2 and T3 set at the node N3 by the processes of sub-step C4 and sub-step C6. The route searcher 29 then compares the candidate overall cost values V2 and V3 of the two candidate labels T2 and T3 and determines the candidate label T3 having the smaller candidate overall cost value V3 as a fixed label, while deleting the other candidate label T2. Accordingly the route from the point of departure S through the link L1, the node N2 and the link L2 to the node N3 is fixed as a halfway route. When it is subsequently determined that the link L2 or the end point of the link L2 (node N3) is not the link or the node where the destination point G is located, the route searcher 29 further extends the search tree by the Dijkstra's algorithm to generate a candidate label T4 (at sub-step C8). More specifically, the route searcher 29 refers to the node data 26 and the link data 25 to specify the link L4 from the node N3 toward the destination point G, and generates a candidate label T4 for a route from the point of departure S through the link L1, the node N2, the link L2 and the node N3 to the link L4. There is only one label T4 generated by extending the search tree from the fixed label determined at previous sub-step C7, and there is no other candidate label. The route searcher 29 then determines the candidate label T4 as a fixed label. Accordingly the route from the point of departure S to the link L4 having the candidate label T4 determined as the fixed label is fixed as a halfway route. Since the destination point G is the node N4, the destination point G is located at the link L4 or the end point of the link L4 (node N4) in the fixed halfway route. The route searcher 29 accordingly determines the halfway route fixed at sub-step C8 as a recommended route from the point of departure S to the destination point G (at sub-step C9). At sub-step C9, the route searcher 29 also refers to the link data 25 to integrate the average cost values AC corresponding to the links L1, L2 and L4 of the recommended route and thereby calculates an average travel time of the recommended route. According to this embodiment, the average travel time is "46 minutes". The route searcher 29 also refers to the link data to calculate an integrated value of variance values (integrated variance value) corresponding to the links L1, L2 and L4 of the recommended route. The positive square root of the integrated variance value is provided as a variance index (standard deviation) indicating the degree of variance of the average travel time. According to this embodiment, the variance index is "4".

Figure 7:
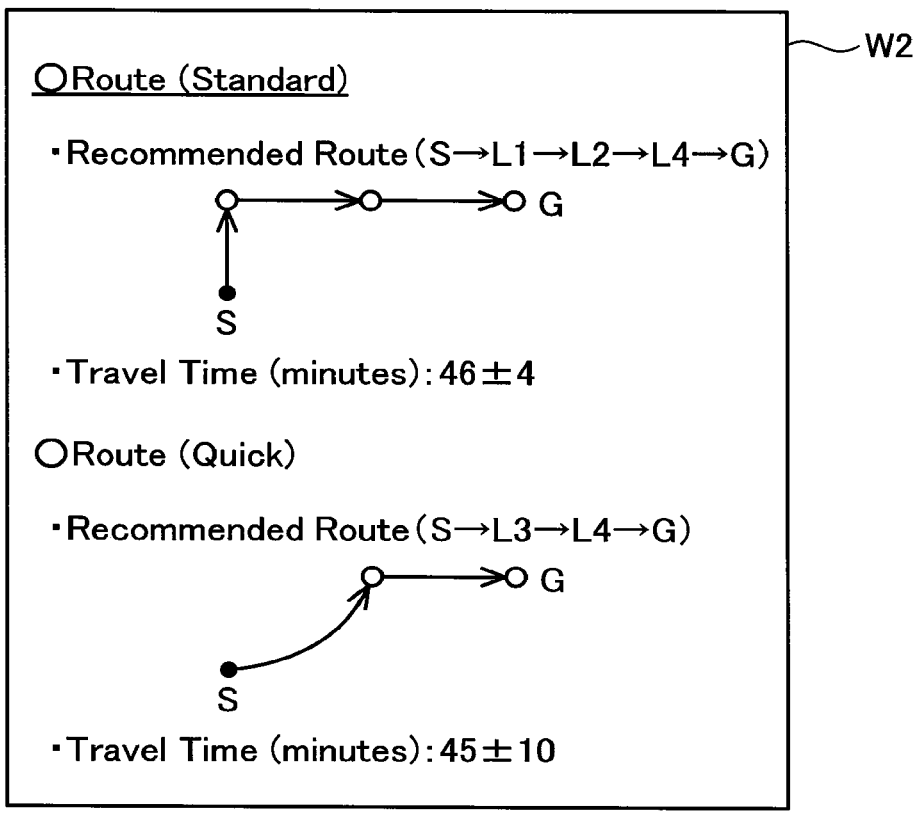
FIG. 7 is a diagram showing an output information window displayed on a display panel.

FIG. 7 is a diagram illustrating an output information window W2 displayed on the display panel 65. According to this embodiment, it is assumed that the user selects two options "standard (λ=1)" and "quick (λ=0)" in the search setting window "1. The output information window W2 includes recommended routes and values of a travel time determined for respective values of the weight coefficient λ. The recommended route is shown by providing marks such as red lines on map data. The travel time is shown by the average travel time and the standard deviation. More specifically, with regard to "route (standard)" having the weight coefficient λ=1, the travel time is shown by a formula (46±4) that is the average travel time of 46 minutes plus minus the standard deviation "4". When the user selects a recommended route between the displayed two routes (standard, quick), the car navigation system 50 starts a route guidance.

As described above, the first embodiment determines the recommended route from the point of departure S representing the place of departure to the destination point G representing the destination, based on the average cost value AC, the variance value VV and the weight coefficient λ. This configuration allows for flexible route search by simply changing the value of the weight coefficient λ.

B. Second Embodiment

Figure 8:
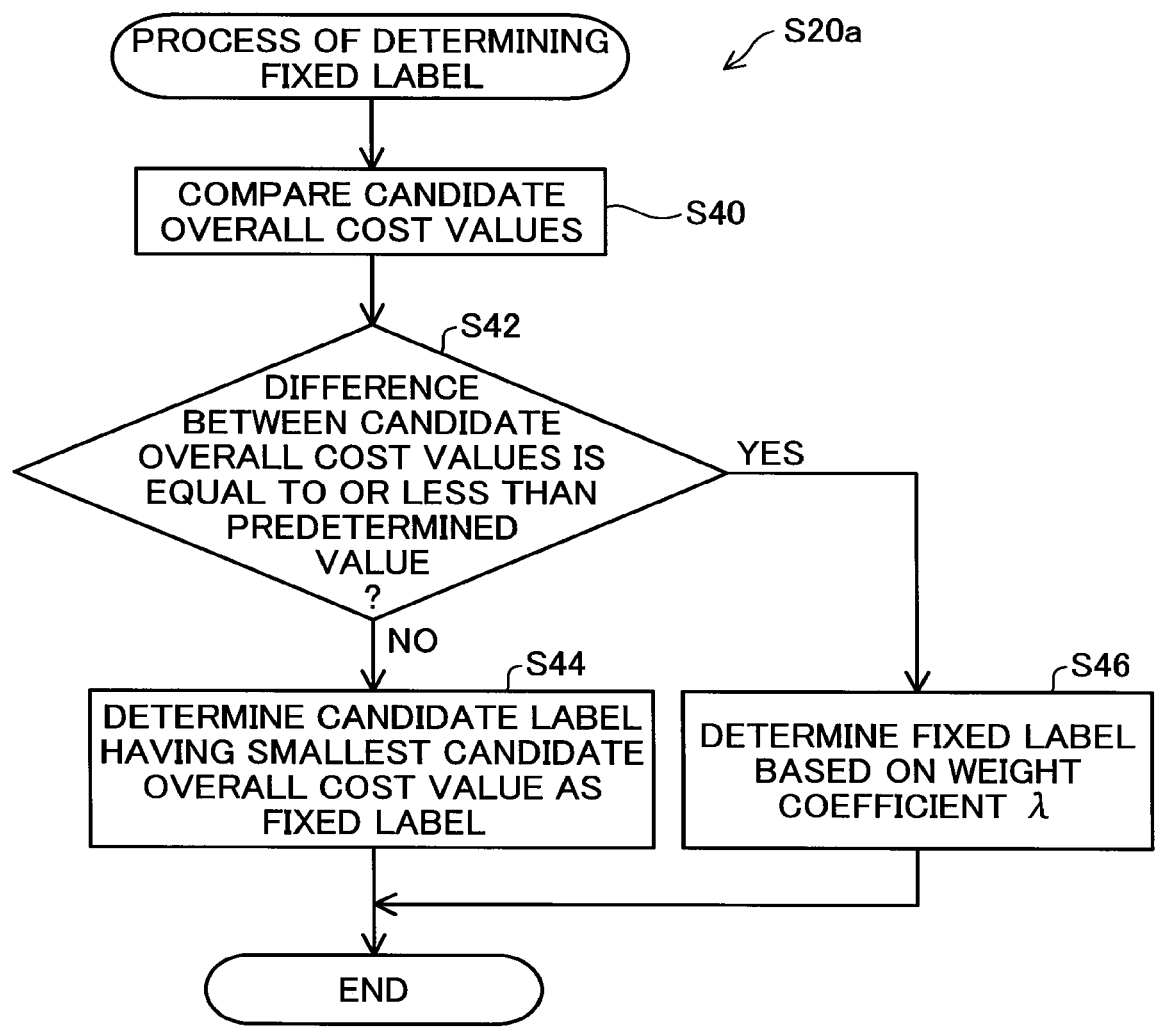
FIG. 8 is a flowchart showing a route search process according to a second embodiment.

FIG. 8 is a flowchart showing a route search process according to a second embodiment of the invention. The route search process of the second embodiment differs from the route search process of the first embodiment (shown in FIG. 5) by the details of the process of determining a candidate label as a fixed label. FIG. 8 accordingly shows the details of a process of determining a fixed label (step S20a) in the route search process. The other processes and the configuration of the route search system 10 are similar to those of the first embodiment and are not specifically described here. At step S20 of the first embodiment, a label having the smallest value among the candidate overall cost values is determined as a fixed label. At step S20a of the second embodiment, on the other hand, a fixed label is determined based on the set weight coefficient λ, when a predetermined condition is satisfied as described below in detail.

At step S20a, the route searcher 29 first compares the candidate overall cost values of the generated candidate labels (step S40). When there are a plurality of candidate overall cost values, the route searcher 29 determines whether a difference between the candidate overall cost values is equal to or less than a predetermined value (step S42). According to this embodiment, the route searcher 29 extracts two candidate overall cost values or more specifically the smallest and the second smallest candidate overall cost values among the plurality of candidate overall cost values, and calculates a difference between the two extracted candidate overall cost values. According to this embodiment, the predetermined value is set to "0.2". The predetermined value may, however, be equal to "0" or may be equal to a numerical value other than 0.2. When it is determined that the difference between the candidate overall cost values is greater than the predetermined value, a candidate label having the smallest candidate overall cost value is determined as a fixed label (step S44). When it is determined that the difference between the candidate overall cost value is equal to or less than the predetermined value, on the other hand, a fixed label is determined, based on the weight coefficient λ, (step S46). More specifically, in a first case having the small weight coefficient λ, a candidate label having the minimum integrated cost value (first term on the right side of Equation (2)) among the plurality of candidate labels is determined as a fixed label. In a second case having the larger weight coefficient λ than that in the first case, a candidate label having the minimum integrated variance value (second term on the right side of Equation (2)) is determined as a fixed label. According to this embodiment, the case having the weight coefficient λ equal to "0" or "1" corresponds to the first case, and the case having the weight coefficient λ equal to "2" corresponds to the second case.

As described above, the second embodiment flexibly determines the recommended route from the point of departure S to the destination point G, based on the set weight coefficient λ. For example, in the first case having the small weight coefficient λ, more emphasis is placed on the average cost value AC than the variance value VV, and the route having the smallest integrated value of the average cost values AC is determined as the recommended route. In the second case having the larger weight coefficient λ than that in the first case, more emphasis is placed on the variance value VV than the average cost value AC, and the route having the smallest integrated value of the variance values is determined as the recommended route.

C. Third Embodiment

Figure 9:
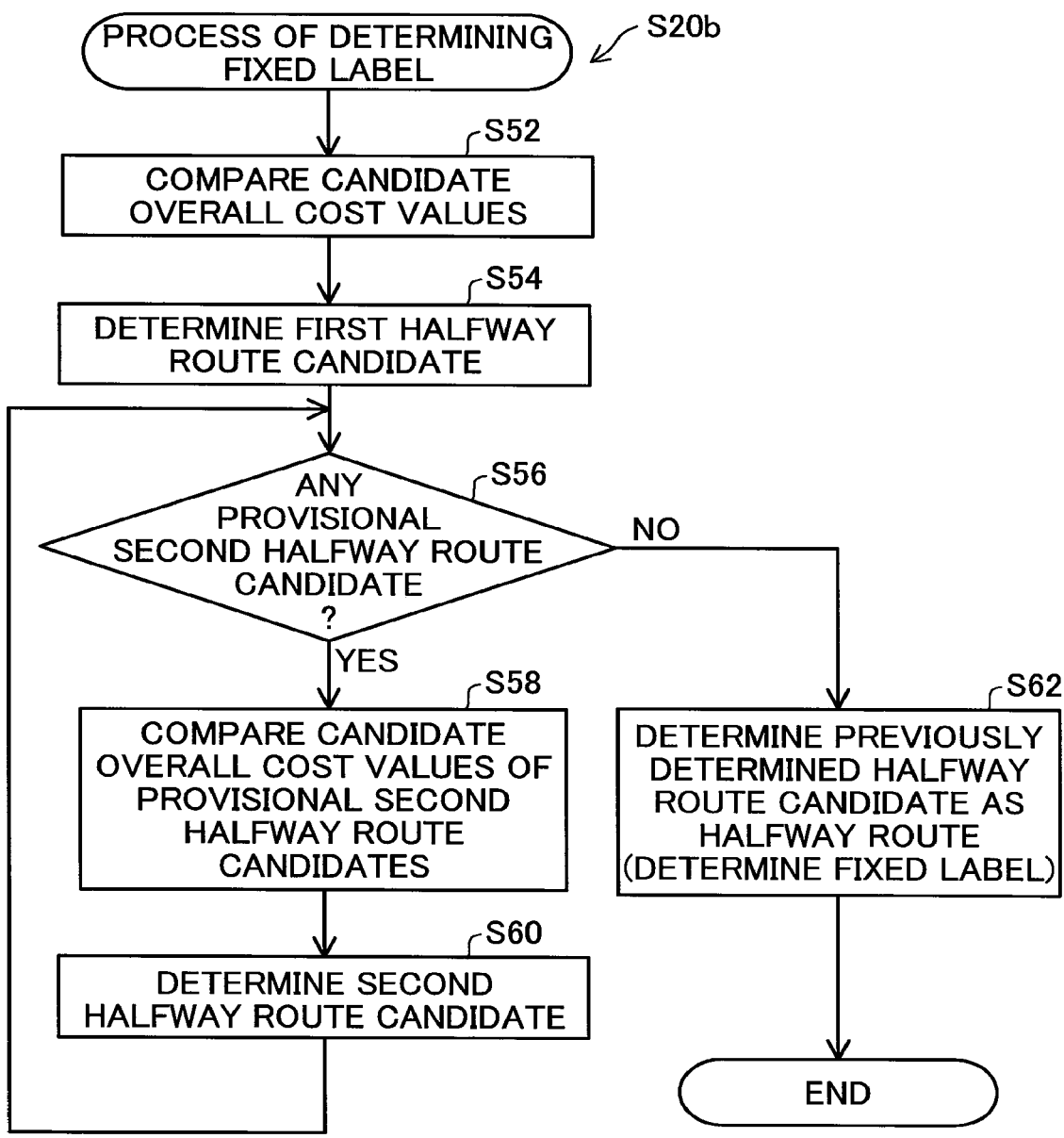
FIG. 9 is a flowchart showing a route search process according to a third embodiment of the invention.

FIG. 9 is a flowchart showing a route search process according to a third embodiment of the invention. FIG. 10 is a first diagram illustrating the flowchart of FIG. 9. FIG. 11 is a second diagram illustrating the flowchart of FIG. 9. FIG. 12 is a third diagram illustrating the flowchart of FIG. 9. FIGS. 10 and 12 illustrate road network data NW2 used for the purpose of describing the third embodiment. According to the third embodiment, a node N6 is set as the point of departure S, a node N30 is set as the destination point G, and there are routes passing through links L5 to L14 in the middle from the point of departure S to the destination point G. In the network data NW2, nodes N6 to N11 which are interconnected by the links L5 to L14 are also illustrated.

The route search process of the third embodiment differs from the route search process of the first embodiment (shown in FIG. 5) by the details of the process of determining a candidate label as a fixed label and a process of determining a recommended route when reaching the destination point G. FIG. 9 accordingly shows the details of a process of determining a fixed label (step S20b) in the route search process. Among the other processes of the third embodiment, the processes similar to those of the first embodiment are not specifically described here. The configuration of the route search system 10 (shown in FIG. 1) is similar to that of the first embodiment. At step S20b of the third embodiment, in addition to a first candidate label having the smallest candidate overall cost value among a plurality of candidate labels, a second candidate label that satisfies a predetermined condition is determined as a fixed label. In the description below, it is assumed that the weight coefficient λ is set to "2". As shown in the field of the processing details of step S52 in FIG. 10, candidate labels T5 to T8 respectively corresponding to routes R5 to R8 from the point of departure S to a node N10 are set at the node N10, in order to determine a halfway route from the point of departure S to the node N10. An integrated value of average cost values AC (integrated cost value), an integrated value of variance values VV (integrated variance value), and a candidate overall cost value calculated according to Equation (2) given above with regard to each of the candidate labels T5 to T8 are also shown in the field of the processing details of step S52 in FIG. 10.

As shown in FIG. 9, at step S20b, the route searcher 29 first compares the candidate overall cost values of the generated candidate labels T5 to T8 (shown in FIG. 10) (step S52), and subsequently determines a candidate label having the smallest candidate overall cost value among the plurality of candidate overall cost values, as a first candidate label (step S54). In the illustrated example of FIG. 10, the candidate label T5 having the candidate overall cost value of "35.0" is determined as the first candidate label, so that the route R5 corresponding to the candidate label T5 is determined as a first halfway route candidate R5 (step S54).

As shown in FIG. 9, the route searcher 29 subsequently determines whether there is any provisional second halfway route candidate (step S56). The provisional second halfway route candidate denotes a route candidate having a smaller integrated cost value than the integrated cost value of the first halfway route candidate R5 among the halfway route candidates R6 to R8 other than the first halfway route candidate R5 (remaining halfway route candidates R6 to R8) as shown in FIG. 10. In the illustrated example of FIG. 10, all the integrated cost values "18, 19, 25" of the candidate labels T6 to T8 are smaller than the integrated cost value "29" of the candidate label T5, so that the halfway route candidates R6 to R8 corresponding to the candidate labels T6 to T8 are the provisional second halfway route candidates R6 to R8.

The route searcher 29 then compares the candidate labels T6 to T8 corresponding to the provisional second halfway route candidates R6 to R8 (step S58) and determines a candidate label having the smallest candidate overall cost value as a second candidate label (step S60). In the illustrated example of FIG. 10, the candidate label T7 having the candidate overall cost value of "47.3" is determined as the second candidate label, so that the route R7 corresponding to the candidate label T7 is determined as a second halfway route candidate R7 (step S60).

The route searcher 29 subsequently specifies the halfway route candidates R6 and R8 other than the previously determined first and second halfway route candidates R5 and R7 as remaining halfway route candidates R6 and R8 and performs the processing of step S56. When the first and the second halfway route candidates R5 and R7 have already been determined, the route searcher 29 specifies the second halfway route candidate R7 determined immediately before the processing of step S56 as the first halfway route candidate R7 and determine whether there is any route candidate having a smaller integrated cost value than the integrated cost value "19" of the first halfway route candidate R7. In the illustrated example of FIG. 11, the integrated cost value "18" of the candidate label T6 is smaller than the integrated cost value "19" of the candidate label T7, so that the halfway route candidate R6 corresponding to the candidate label T6 is the provisional second halfway route candidate R6.

The route searcher 29 then performs the processing of steps S58 and S60 shown in FIG. 9. As shown in FIG. 11, there is only one provisional second halfway route candidate R6, so that the provisional second halfway route candidate R6 is determined as a second halfway route candidate R6 (steps S58 and S60).

As shown in FIG. 9, after step S60, the route searcher 29 specifies the halfway route candidate R8 other than the previously determined first and second halfway route candidates R5 to R7 as a remaining halfway route candidate R8 and performs the processing of step S56 again. As shown in FIG. 11, the integrated cost value "25" of the candidate label T8 corresponding to the remaining halfway route candidate R8 is larger than the integrated cost value "18" of the candidate label T6 corresponding to the most recently determined second halfway route candidate R6. As shown in FIG. 9, the route searcher 29 then provides a negative answer "NO" at step S56 and determines the previously determined candidate labels T5 to T7 as fixed labels. Accordingly the first and second halfway route candidates R5 to R7 corresponding to the fixed labels T5 to T7 are determined as halfway routes R5 to R7 (step S62).

As shown in FIG. 12, the route searcher 29 extends the search tree from the halfway routes R5 to R7 corresponding to the fixed labels T5 to T7 toward the destination point G and generates candidate labels T9 to T11. The route searcher 29 performs the processing of steps S52 to S62 with regard to the candidate labels T9 to T11. In the illustrated example of FIG. 12, the processing of steps S52 and S54 is performed to select the candidate label T11 having the smallest candidate overall cost value and determine the route R11 corresponding to the candidate label T11 as a first halfway route candidate R11. The processing of step S56 is subsequently performed. In the illustrated example of FIG. 12, there is the route candidate R10 (provisional second halfway route candidate R10) having a smaller integrated cost value than the integrated cost value "79" of the first halfway route candidate R11 out of remaining halfway route candidates R9 and R10, so that an affirmative answer "YES" is provided at step S56. The processing of steps S58 and S60 is then performed. There is only one provisional second halfway route candidate R10, so that the provisional second halfway route candidate R10 is determined as a second halfway route candidate R10.

After step S60, the route searcher 29 specifies the halfway route candidate R9 other than the previously determined first and second halfway route candidates R11 and R10 as a remaining halfway route candidate R9 and performs the processing of step S56 again. As shown in FIG. 12, the integrated cost value "89" of the candidate label T9 corresponding to the remaining halfway route candidate R9 is larger than the integrated cost value "78" of the candidate label T10 corresponding to the most recently determined second halfway route candidate R10. As shown in FIG. 9, the route searcher 29 then provides a negative answer "NO" at step S56 and determines the previously determined candidate labels T11 and T10 as fixed labels. Accordingly the first and second halfway route candidates R11 and R10 corresponding to the fixed labels T11 and T10 are determined as halfway routes R11 and R10 (step S62).

After determining the halfway routes, the route searcher 29 determines whether a last link or a node (last node) that is an end point of the last link in the halfway route toward the destination point G is a link or a node where the destination point G is located (step S22 in FIG. 5). When it is determined that the last link or the last node is the link or the node where the destination point G is located, the route searcher 29 fixes the halfway route as a recommended route. When there are a plurality of halfway routes (for example, the halfway routes R10 and R11 at step S62 in FIG. 12), the route searcher 29 fixes a halfway route having the smallest candidate overall cost value among the plurality of halfway routes, as a recommended route. For example, when the node N11 is set as the destination point G in the network data NW2 shown in FIG. 12, the halfway route R10 having the smaller candidate overall cost value out of the halfway route R10 and R11 determined at step S62 is fixed as a recommended route.

At the point of the node N10, the candidate label T5 is the first candidate label having the smallest candidate overall cost value as shown in FIG. 10. After the search tree is extended, however, the candidate label T11 is the first candidate label as shown in FIG. 12. The candidate label T11 is a label by extending the search tree from the candidate label T7 in FIG. 10. In the case of extending the search tree with determining only a label having the smallest candidate overall cost value as a fixed label, a route having the smallest candidate overall cost value is likely to be not determinable as a recommended route. As described above, however, this embodiment determines a candidate label having the smallest candidate overall cost value (first candidate label) and additionally a candidate label that satisfies a predetermined condition (second candidate label) among candidate labels having smaller integrated cost values than the first candidate label, as fixed labels. This configuration enables a route having the smallest overall cost value to be determined more accurately as a recommended route.

There is the following correspondence relationship between the respective steps of the third embodiment and the processes described in Summary:

Steps S52 and S54 correspond to the "first determination process";
Steps S56 to S60 correspond to the "second determination process"; and
Steps S56 to S60 performed after step S60 correspond to the "third determination process".

D. Modifications

D-1. First Modification

Figure 13:
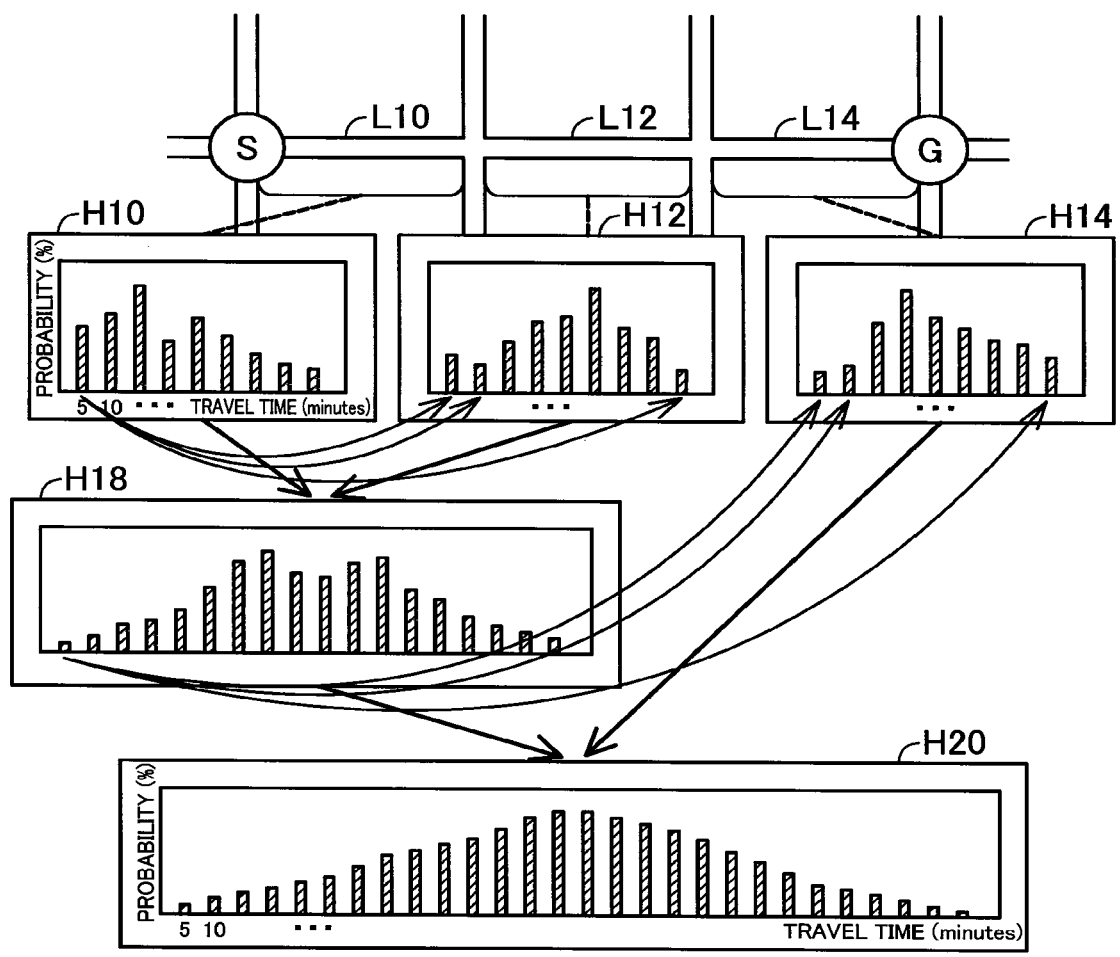
FIG. 13 is a conceptual view showing a convolution operation.

In the first and the second embodiments described above, the positive square root of the integrated variance value is calculated as the variance index. According to a modification, statistical information indicating histograms used for calculating the average cost values AC of the respective links constituting a recommended route or a halfway route may be used. More specifically, statistical information of the respective links may be processed by convolution operation, and a standard deviation calculated from statistical information indicating a histogram after the convolution operation may be used as the variance index. An average cost value calculated from the statistical information indicating the histogram after the convolution operation may be used to determine a recommended route or a halfway route. The details are described below. FIG. 13 is a conceptual view showing the convolution operation. In the illustrated example of FIG. 13, a recommended route from a point of departure S to a destination point G is comprised of links L10, L12 and L14. The link data 25 includes data (statistical information) indicating histograms H10, H12 and H14, in addition to link numbers, starting point nodes, end point nodes, average cost values AC and variance values VV. The histograms H10, H12 and H14 may be generated, for example, based on probe data collected from probe cars. In the histograms H10, H12 and H14, the travel time (minutes) of a link is shown as abscissa and the probability (%) of each travel time is shown as ordinate. The histograms of the first link L10 and the next link L12 in a route from the point of departure S toward the destination point G are processed by convolution operation, and a new histogram H18 is generated. The histogram H14 of the next link L14 subsequent to the link L12 and the histogram H18 are processed by convolution operation, and a new histogram H20 is generated. A standard deviation is calculated from statistical information indicating the histograms H18 and H20 generated by the convolution operation. In other words, the convolution operation of the histograms is defined by Equation (3) given below:

[Math. 3]

$$F(m) = \sum_n f(n)g(m-n) \qquad (3)$$

where F(m) on the left side denotes a function generated by convolution operation of two histograms; f denotes a function defined by the first histogram; g denotes a function defined by the second histogram; n denotes the travel time in the first histogram; and m denotes the travel time (total time) in convolution operation of the first histogram and the second histogram. Like the first embodiment and the second embodiment described above, this also calculates the standard deviation as the variance index of the travel time in the recommended route or the halfway route. Calculating the standard deviation from the statistical information indicating a histogram after the convolution operation provides a more accurate variance index having a reduced error, compared with the above embodiments.

The following describes a process of determining a halfway route using the statistical information indicating the histogram after the convolution operation according to the first modification. The route searcher 29 (shown in FIG. 1) processes statistical information indicating respective histograms of the travel time of respective links that are passed through in halfway route candidates as candidates of a halfway route by convolution operation, so as to generate candidate statistical information indicating histograms of the travel time in the respective halfway route candidates. The route searcher 29 subsequently calculates a candidate overall cost value of each halfway route candidate according to a function including the weight coefficient λ and a candidate average cost value At1 indicating an average of the travel time of the halfway route candidate and a candidate variance value VV (dispersion in this modification) indicating the degree of variance of the halfway route candidate that are calculated from the candidate statistical information. For example, the route searcher 29 may calculate the candidate overall cost value according to Equation (4) given below:
[Math. 4]

$$\text{Candidate overall cost value} = At1 + \lambda\sqrt{Vt1} \qquad (4)$$

where At1 denotes a candidate average cost value calculated from the candidate statistical information; λ, denotes the weight coefficient; and Vt1 denotes a candidate variance value VV (dispersion) calculated from the candidate statistical information.

The right side of Equation (4) given above is defined by a first term representing the candidate average cost value and a second term representing a correction value as the product of the positive square root of the candidate variance value VV and the weight coefficient λ, but this is not restrictive. For example, the second term may be the product of the candidate variance value VV and the weight coefficient λ. The right side of Equation (4) given above may additionally include a third term and a fourth term. For example, the third term may be defined as a term for increasing the cost value as traffic congestion information in the case of traffic congestion on a specific link. This process uses the candidate variance value VV calculated from the candidate statistical information after the convolution operation to calculate the candidate overall cost value. This enables the halfway route to be determined using the candidate overall cost value calculated from the more accurate variance value VV having a reduced error.

D-2. Second Modification

Figure 14:
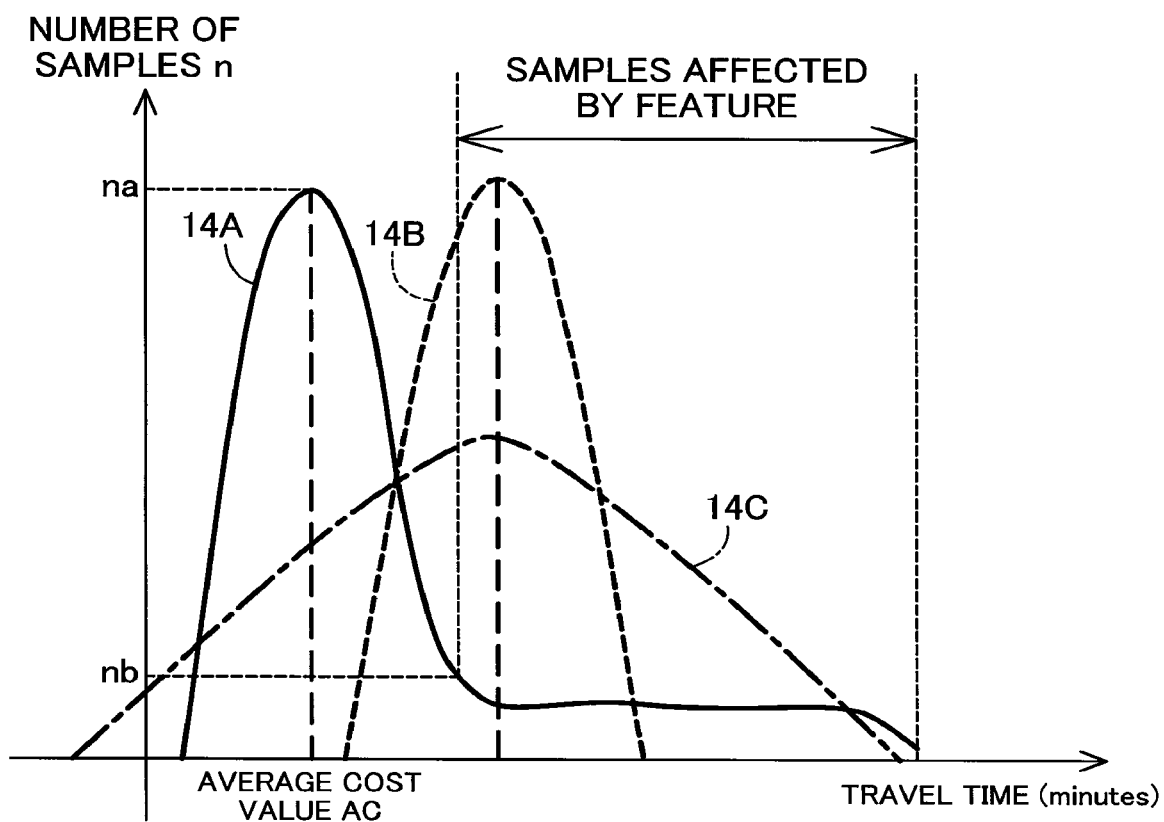
FIG. 14 is a diagram illustrating a method of calculating an average cost value and a variance value.

FIG. 14 is a diagram showing a method of calculating an average cost value AC and a variance value VV with regard to a specific link L. A graph 14A in FIG. 14 is generated based on probe data and has the travel time (minutes) of the link L as abscissa and the number of samples n (probability) of each travel time as ordinate. The probability is calculated based on the number of samples. A graph 14B is a conceptual diagram of a normal distribution based on the average value of the information expressed by the graph 14A (original information) and the variance value determined from information after deletion of data of the travel time estimated to be affected by a feature from the graph 14A. A graph 14C is a conceptual diagram of a normal distribution based on the information expressed by the graph 14A (original information).

When the link L (specific link L) has a specific feature such as a traffic light or a railway crossing that affects the travel time or when a link adjacent to the specific link L has a specific feature such as a traffic light or a railway crossing, the specific feature provides an effect of increasing the travel time in the specific link L at a certain frequency. It is, however, unlikely that the travel time is increased by the specific feature in all the links that are passed through from a place of departure to a destination. The average cost value AC and the variance value VV of the specific link L may thus be calculated as described below. The average cost value AC may be calculated from the entire travel time data expressed by the graph 14A as the original information and their probabilities. The variance value VV may be calculated from the travel time data estimated to be not affected by the specific feature and their probabilities out of the entire data expressed by the graph 14A as the original information. In other words, the variance value VV may be calculated based on the variance value determined from data after deletion of data, such as the travel time, estimated to be affected by the specific feature from the data of the original information. For example, the "data estimated to be affected by the specific feature" may be data of the longer travel time than a minimum travel time at which the number of samples becomes equal to or lower than a predetermined rate (for example, equal to or lower than 10%) of the number of samples na corresponding to the average cost value AC, out of the data of the longer travel time than the average cost value AC. In another example, the "data estimated to be affected by the specific feature" may be data of the long travel time at a predetermined rate or higher among the number of samples n (for example, data of the top 10%). In FIG. 14, data that is equal to or less than the number of samples nb out of the data having the longer travel time than the average cost value AC is estimated as data affected by the feature and is omitted from calculation of the variance value VV. The normal distribution based on all the data of the original information (graph 14C) provides the excessive variance value VV. The normal distribution based on the information after deletion of the data estimated to be affected by the feature (graph 14B) is, on the other hand, appropriately corrected without providing the excessive variance value VV. As described above, the second modification provides the average cost value AC that accurately reflects the travel time data of the original information, while correcting the variance value that is made excessive by the effect of the feature.

D-3. Third Modification

According to the first and the second embodiments described above, the route server 20 performs the route search process, and the car navigation system 50 receives the result of the route search process and displays the output information on the display panel 65. This configuration is, however, not restrictive, but the output information may be displayed on the display panel 65 by any of various other configurations. For example, the route server 20 may send network data of a required range including a place of departure and a destination to the car navigation system 50. The car navigation system 50 may receive the network data, perform the route search process and display the output information on the display panel 65. The car navigation system 50 may provide the user with audio output information. The car navigation system 50 itself may be provided with the functions of the route server 20.

D-4. Fourth Modification

The car navigation system 50 in the first and the second embodiments described above may be replaced by any of various other devices having the function of providing the user with output information, for example, a cell phone or a personal computer.

D-5. Fifth Modification

In the first and the second embodiment described above, the overall cost value and the candidate overcall cost value are calculated according to the relational expressions of Equations (1) and (2) given above. In Equations (1) and (2), the second term on the right side is the product of the weight coefficient $\lambda$ and a value having the positive correlation to the integrated value of the variance value VV (more specifically, the positive square root). These Equations (1) and (2) are, however, not restrictive, but the overall cost value and the candidate overall cost value may be calculated using a function including the average cost value AC, the variance value VV and the weight coefficient $\lambda$. For example, the second term on the right side in Equation (1) given above may be replaced by the product of the integrated value of the variance value and the weight coefficient. The right side of Equation (1) or (2) given above may additionally include a third term and a fourth term. For example, the third term may be defined as a term for increasing the cost value as traffic congestion information in the case of traffic congestion on a specific link.

D-6. Sixth Modification

Part of the functions implemented by the software configuration in the above first or second embodiment may be implemented by a hardware configuration, and part of the functions implemented by the hardware configuration may be implemented by a software configuration.

The invention is not limited to any of the embodiments and modifications described above but may be implemented by a diversity of other configurations without departing from the scope of the invention. For example, the technical features of any of the embodiments and modifications corresponding to the technical features of each of the aspects described in Summary may be replaced or combined appropriately, in order to solve part or all of the problems described above. Any of the technical features may be omitted appropriately unless the technical feature is described as essential herein.

REFERENCE SIGNS LIST 10 route search system
12 automobile
18 histogram
20 route server
21 communicator
22 controller
23 route database
24 network data
25 link data
26 node data
28 map database
29 route searcher
31 node attribute data
34 link attribute data
50 car navigation system
51 main controller
52 CPU
61 communicator
63 audio output part
65 display panel
67 operating part
W1 search setting window
N1 - N4 nodes
L1 - L4, L10 - L14 links
W2 output information window

The invention claimed is:

1. A route search apparatus configured to search a route from a set place of departure to a set destination, the route search apparatus comprising:
    a memory device under control of process circuitry and configured to store network data that includes nodes and links representing a road network, an average cost value indicating an average of travel time of each of the links, and a variance value indicating a degree of variance of the travel time; and
    the process circuitry configured to
    determine a plurality of halfway route candidate routes from the place of departure to a node corresponding to a specific point in the middle of the route from the place of departure to the destination based on respective candidate overall cost values for each of the plurality of halfway route candidates that are calculated as a sum of a first term representing an integrated value of the average cost values corresponding to links that are passed through from the place of departure to the node corresponding to the specific point in the middle of the route from the place of departure to the destination and a second term representing a correction value calculated based on a weight coefficient and an integrated value of the variance values corresponding to the links that are passed through,
perform a first determination process that identifies from the plurality of halfway route candidate routes a first halfway route candidate having a smallest candidate overall cost value out of the respective candidate overall cost values,
determines whether the destination is located at a last link or last node of the first halfway route candidate, and
fix the first halfway route candidate as the recommended route when it is determined that the destination is located at the last link or the last node of the first halfway route candidate.

2. The route search apparatus according to claim 1, wherein the process circuitry calculates for the plurality of halfway route candidates the respective overall cost values by adding a correction value calculated as a product of the weight coefficient and a value having a positive correlation to an integrated value of the variance values corresponding to links that are passed through between the place of departure and the destination, to an integrated value of the average cost values corresponding to the links.

3. The route search apparatus according to claim 1, wherein when there are a plurality of the respective candidate overall cost values that are different from each other by at most a predetermined value, the process circuitry determines the first halfway route candidate, based on one of the first term and the second term that is selected according to the weight coefficient.

4. The route search apparatus according to claim 1, wherein the process circuitry is further configured to:
perform a second determination process when there is at least one provisional second halfway route candidate having a smaller integrated value of the average cost values than an integrated value of the average cost values of the first halfway route candidate, out of remaining halfway route candidates that are the halfway route candidates other than the first halfway route candidate, and deter lines a second halfway route candidate having a smallest candidate overall cost value out of at least one provisional second halfway route candidate;
perform a third determination process that specifies the second halfway route candidate determined by the second determination process, as the first halfway route candidate, specifies the halfway route candidate other than the determined first halfway route candidate and second halfway route candidate, as the remaining halfway route candidate, and repeats the second determination process, and
identify the first halfway route candidate and the second halfway route candidate determined by the first to the third determination processes as halfway routes.

5. The route search apparatus according to claim 1, wherein the process circuitry processes statistical information indicating histograms of the travel time of respective links corresponding to roads that are passed through in each of the halfway route candidates, by convolution operation, so as to generate candidate statistical information indicating a histogram of the travel time with regard to each of the halfway route candidates, and
the process circuitry identifies the first halfway route out of the plurality of halfway route candidates based on the respective candidate overall cost values calculated according to a function including the weight coefficient and a candidate average cost value representing an average of the travel time of each of the halfway route candidates and a candidate variance value representing a degree of variance of the travel time of the halfway route candidate that are calculated from the candidate statistical information.

6. The route search apparatus according to claim 5, wherein the process circuitry calculates the respective candidate overall cost values according to a function including a first term representing the candidate average cost value and a second term representing a correction value calculated based on the candidate variance value and the weight coefficient.

7. The route search apparatus according to claim 1, wherein the process circuitry determines the recommended route with regard to each of a plurality of different values of the weight coefficient.

8. The route search apparatus according to claim 5, wherein the process circuitry calculates an index indicating a degree of variance of the travel time of the recommended route, based on a standard deviation of the generated statistical information.

9. The route search apparatus according to claim 1, wherein
the average cost value and the variance value with regard to each of the links are calculated based on original information regarding travel time data of the travel time and a probability of each travel time, and
when the travel time of a link is affected by a feature at a certain frequency,
the average cost value of a specific link that is the link affected by the feature is calculated from the entire travel time data and all the probabilities included in the original information, and
the variance value of the specific link is calculated from the travel time data and the probability that are estimated to be not affected by the feature in the original information.

10. A route search method of searching a route from a place of departure to a destination, comprising:
storing network data in a memory device under control of process circuitry, the network data including nodes and links representing a road network, an average cost value indicating an average of travel time of each of the links, and a variance value indicating a degree of variance of the travel time;
determining using the processing circuitry a plurality of halfway route candidate routes from the place of departure to a node corresponding to a specific point in the middle of the route from the place of departure to the destination based on respective candidate overall cost values for each of the plurality of halfway route candidates that are calculated as a sum of a first term representing an integrated value of the average cost values corresponding to links that are passed through from the place of departure to the node corresponding to the specific point in the middle of the route from the place of departure to the destination and a second term representing a correction value calculated based on a weight coefficient and an integrated value of the variance values corresponding to the links that are passed through, performing a first determination process that identifies from the plurality of halfway route candidate routes a first halfway route candidate having a smallest candidate overall cost value out of the respective candidate overall cost values, determining whether the destination is located at a last link or last node of the first halfway route candidate, and fixing the first halfway route candidate as the recommended route when it is determined that the destination is located at the last link or the last node of the first halfway route candidate.

11. A non-transitory computer readable storage medium storing a program configured to cause process circuitry of a computer to implement a function of searching a route from a place of departure to a destination, the program causing the computer to implement the functions of:

storing network data in a memory device under control of the process circuitry, the network data including nodes and links representing a road network, an average cost value indicating an average of travel time of each of the links, and a variance value indicating a degree of variance of the travel time;

determining using the processing circuitry a plurality of halfway route candidate routes from the place of departure to a node corresponding to a specific point in the middle of the route from the place of departure to the destination based on respective candidate overall cost values for each of the plurality of halfway route candidates that are calculated as a sum of a first term representing an integrated value of the average cost values corresponding to links that are passed through from the place of departure to the node corresponding to the specific point in the middle of the route from the place of departure to the destination and a second term representing a correction value calculated based on a weight coefficient and an integrated value of the variance values corresponding to the links that are passed through, performing a first determination process that identifies from the plurality of halfway route candidate routes a first halfway route candidate having a smallest candidate overall cost value out of the respective candidate overall cost values, determining whether the destination is located at a last link or last node of the first halfway route candidate, and fixing the first halfway route candidate as the recommended route when it is determined that the destination is located at the last link or the last node of the first halfway route candidate.

12. A route search apparatus configured to search a route from a set place of departure to a set destination, the route search apparatus comprising:

a memory device under control of process circuitry and configured to store network data that includes nodes and links representing a road network, an average cost value indicating an average of travel time of each of the links, and a variance value indicating a degree of variance of the travel time; and the process circuitry configured to determine a plurality of halfway route candidate routes from the place of departure to a node corresponding to a specific point in the middle of the route from the place of departure to the destination based on respective candidate overall cost values for each of the plurality of halfway route candidates that are calculated as a sum of a first term representing an integrated value of the average cost values corresponding to links that are passed through from the place of departure to the node corresponding to the specific point in the middle of the route from the place of departure to the destination and a second term representing a correction value calculated based on a weight coefficient and an integrated value of the variance values corresponding to the links that are passed through, perform a first determination process that identifies from the plurality of halfway route candidate routes a first halfway route candidate having a smallest candidate overall cost value out of the respective candidate overall cost values, determines whether the destination is located at a last link or last node of the first halfway route candidate, fix the first halfway route candidate as the recommended route when it is determined that the destination is located at the last link or the last node of the first halfway route candidate, and control display of the recommended route on a display panel.

13. A route search method of searching a route from a place of departure to a destination, comprising:

storing network data in a memory device under control of process circuitry, the network data including nodes and links representing a road network, an average cost value indicating an average of travel time of each of the links, and a variance value indicating a degree of variance of the travel time;

determining using the processing circuitry a plurality of halfway route candidate routes from the place of departure to a node corresponding to a specific point in the middle of the route from the place of departure to the destination based on respective candidate overall cost values for each of the plurality of halfway route candidates that are calculated as a sum of a first term representing an integrated value of the average cost values corresponding to links that are passed through from the place of departure to the node corresponding to the specific point in the middle of the route from the place of departure to the destination and a second term representing a correction value calculated based on a weight coefficient and an integrated value of the variance values corresponding to the links that are passed through, performing a first determination process that identifies from the plurality of halfway route candidate routes a first halfway route candidate having a smallest candidate overall cost value out of the respective candidate overall cost values, determining whether the destination is located at a last link or last node of the first halfway route candidate, fixing the first halfway route candidate as the recommended route when it is determined that the destination is located at the last link or the last node of the first halfway route candidate, and controlling, using the processing circuitry, display of the recommended route on a display panel, the display panel being a component of a hand held device, a personal computer, or a car navigation system.

14. A non-transitory computer readable storage medium storing a program configured to cause process circuitry of a computer to implement a function of searching a route from a place of departure to a destination, the program causing the computer to implement the functions of:

storing network data in a memory device under control of the process circuitry, the network data including nodes and links representing a road network, an average cost value indicating an average of travel time of each of the links, and a variance value indicating a degree of variance of the travel time;

determining using the processing circuitry a plurality of halfway route candidate routes from the place of departure to a node corresponding to a specific point in the middle of the route from the place of departure to the destination based on respective candidate overall cost values for each of the plurality of halfway route candidates that are calculated as a sum of a first term representing an integrated value of the average cost values corresponding to links that are passed through from the place of departure to the node corresponding to the specific point in the middle of the route from the place of departure to the destination and a second term representing a correction value calculated based on a weight coefficient and an integrated value of the variance values corresponding to the links that are passed through, performing a first determination process that identifies from the plurality of halfway route candidate routes a first halfway route candidate having a smallest candidate overall cost value out of the respective candidate overall cost values, determining whether the destination is located at a last link or last node of the first halfway route candidate, fixing the first halfway route candidate as the recommended route when it is determined that the destination is located at the last link or the last node of the first halfway route candidate, and controlling, using the processing circuitry, display of the recommended route on a display panel, the display panel being a component of a hand held device, a personal computer, or a car navigation system.

15. The route search apparatus according to claim 12, wherein the display panel is a component of a hand held device, a personal computer, or a car navigation system.

16. The route search method according to claim 13, wherein the display panel is a component of a hand held device, a personal computer, or a car navigation system.

17. The non-transitory computer readable storage medium according to claim 14, wherein the display panel is a component of a hand held device, a personal computer, or a car navigation system.

18. The route search apparatus according to claim 1, wherein the process circuitry is further configured to extend a search tree from the last link or the last node of the first halfway route candidate to the destination when it is determined that the destination is not located at the last link or the last node of the first halfway route candidate.

19. The route search method according to claim 10, wherein the process circuitry is further configured to extend a search tree from the last link or the last node of the first halfway route candidate to the destination when it is determined that the destination is not located at the last link or the last node of the first halfway route candidate.

20. The non-transitory computer readable storage medium according to claim 11, wherein the process circuitry is further configured to extend a search tree from the last link or the last node of the first halfway route candidate to the destination when it is determined that the destination is not located at the last link or the last node of the first halfway route candidate.

* * * * *